(12) United States Patent
Shaw

(10) Patent No.: US 8,417,221 B2
(45) Date of Patent: Apr. 9, 2013

(54) INTERACTIVE PERSONALIZED E-EXPERIENCE SYSTEM AND METHOD FOR VISUAL VOICE MAIL

(75) Inventor: Venson M. Shaw, Kirkland, WA (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 125 days.

(21) Appl. No.: 12/796,333

(22) Filed: Jun. 8, 2010

(65) Prior Publication Data

US 2011/0300832 A1 Dec. 8, 2011

(51) Int. Cl.
*H04L 12/58* (2006.01)
(52) U.S. Cl. ............... 455/412.1; 455/414.1; 455/456.3
(58) Field of Classification Search .... 455/414.1–414.3, 455/440, 456.1–457
See application file for complete search history.

(56) References Cited

U.S. PATENT DOCUMENTS

| | | | |
|---|---|---|---|
| 2004/0078209 A1* | 4/2004 | Thomson | 705/1 |
| 2005/0170816 A1* | 8/2005 | Pelaez et al. | 455/412.2 |
| 2006/0058037 A1* | 3/2006 | Kenyon | 455/456.1 |
| 2008/0045236 A1* | 2/2008 | Nahon et al. | 455/456.1 |
| 2011/0218864 A1* | 9/2011 | Pentz et al. | 705/14.71 |

\* cited by examiner

*Primary Examiner* — Chuong A Ngo
(74) *Attorney, Agent, or Firm* — Woodcock Washburn LLP

(57) ABSTRACT

In-person shopping at brick-and-mortar locations can be facilitated using visual voicemail systems. A user device can be detected upon entry or proximity to a retail location and a greeting visual voicemail message can be transmitted to the user device. User data may be integrated into the greeting message. The greeting message can also include options for a user to activate that allow the integration of the virtual and physical shopping experience. Options can include requests for sales associate help, product information or location, associated service plans or accessories, etc. Multiple remote resources can be coordinated to service a user's requests via a visual voicemail system while the user is shopping in the retail location.

20 Claims, 9 Drawing Sheets

INTERACTIVE PERSONALIZED E-EXPERIENCE SYSTEM AND METHOD FOR VISUAL VOICE MAIL

TECHNICAL FIELD

The technical field generally relates to wireless communications and more specifically relates to visual voicemail systems.

BACKGROUND

Communications devices such as cellular telephones, mobile communication devices, personal digital assistants (PDAs), laptops, and the like are becoming more prevalent as technology advances and makes these devices more powerful and more affordable. These devices are also being constructed with increasing capabilities and can now perform functions that have in the past been performed by dedicated special function communications devices. For instance, a common mobile communications device today may have computing capabilities that allow the device to process multimedia content, the ability to communicate with data networks such as the Internet, a display than can render high quality still images and video, audio capabilities that allow the device to play music and video soundtracks, as well as the ability to place and receive traditional mobile telephone calls and text messages.

The expanding capabilities of mobile communications devices have allowed the improvement and enhancement of more traditional technologies. For example, voicemail has traditionally been an audio-only feature that requires a telephone connection to a voicemail server. Traditionally, a user would receive a message waiting notification that a voicemail is available, and the user would then have to dial into a voicemail server to listen to the message. Thanks to technological advances, visual voicemail is available on many mobile communications devices. Visual voicemail presents a visual interface to a user's voicemail box and allows the user to view attributes of voicemail and manipulate voicemail in various ways that were previously not possible. A user may delete or save voicemail through the visual interface without having to place a telephone call to a voicemail server. A user may also be able to see who the voicemail is from, when it was sent or received, and other characteristic of the voicemail without actually placing a telephone call to a voicemail server. A user may also respond to a visual voicemail message with a reply visual voicemail, thus enabling two way communication through a visual voicemail system. Visual voicemail systems may also provide a means for a sender to include multimedia content to accompany a voice message or to be provided instead of a voice message.

While more and more shopping is done online, physical store locations retain the bulk of the retail market and will remain an important tool for retailer for many reasons. Potential buyers are often shopping for physical objects and may want to see or handle products prior to purchase. Potential buyers may also want to interact with actual store personnel during while shopping and purchasing goods and services. However, often the best resources to service a particular shopper may not be available in a physical store, but may instead be more readily available online or from personnel or devices that are remote to a physical store. Therefore, what is needed in the art are systems, devices, and methods for leveraging remote and online resources during a shopping experience in a physical retail location.

SUMMARY

In-person shopping at brick-and-mortar locations remains, and is likely to remain, the predominate form of shopping. However, the shopping experience may be improved by integrating the use of visual voicemail systems. Upon entry into a physical retail location, a user device may be detected using any of a variety of wireless technologies, and user data may be located based upon such detection. A greeting visual voicemail message may be generated, which may include user data and may be personalized according to user characteristics, transmitted to the user device. The greeting message may also include options that a user may activate that allow the user to request various services via a visual voicemail system. In an embodiment, a user can requests sales associate help, product information or location, associated service plans or accessories, etc. Alternatively, a user may request that no sales associate contact the user while the user is browsing. A request submitted by a user may results in multiple remote resources being coordinated to service the request via a visual voicemail system while the user is at the retail location.

Wireless detection units, such as wireless hubs, routers, or similar devices, may be configured throughout a store or other premises and may be associated with particular products. For example, displays of products may each have a wireless device proximately configured, and the various wireless hubs at product displays throughout a store may work together to determine which is detecting the strongest signal or otherwise is most proximate to a user device. A visual voicemail message may then be generated based on the user device's proximity to a particular product, for example, containing product specific information. Option that are specific to the product may also be included in the visual voicemail message, such as an option to buy the product, more information on the product, etc. These and other aspects are described in more detail below and in the accompanying drawings.

BRIEF DESCRIPTION OF THE DRAWINGS

The following detailed description of preferred embodiments is better understood when read in conjunction with the appended drawings. For the purposes of illustration, there is shown in the drawings exemplary embodiments; however, the subject matter is not limited to the specific elements and instrumentalities disclosed. In the drawings.

DETAILED DESCRIPTION OF ILLUSTRATIVE EMBODIMENTS

Figure 1:
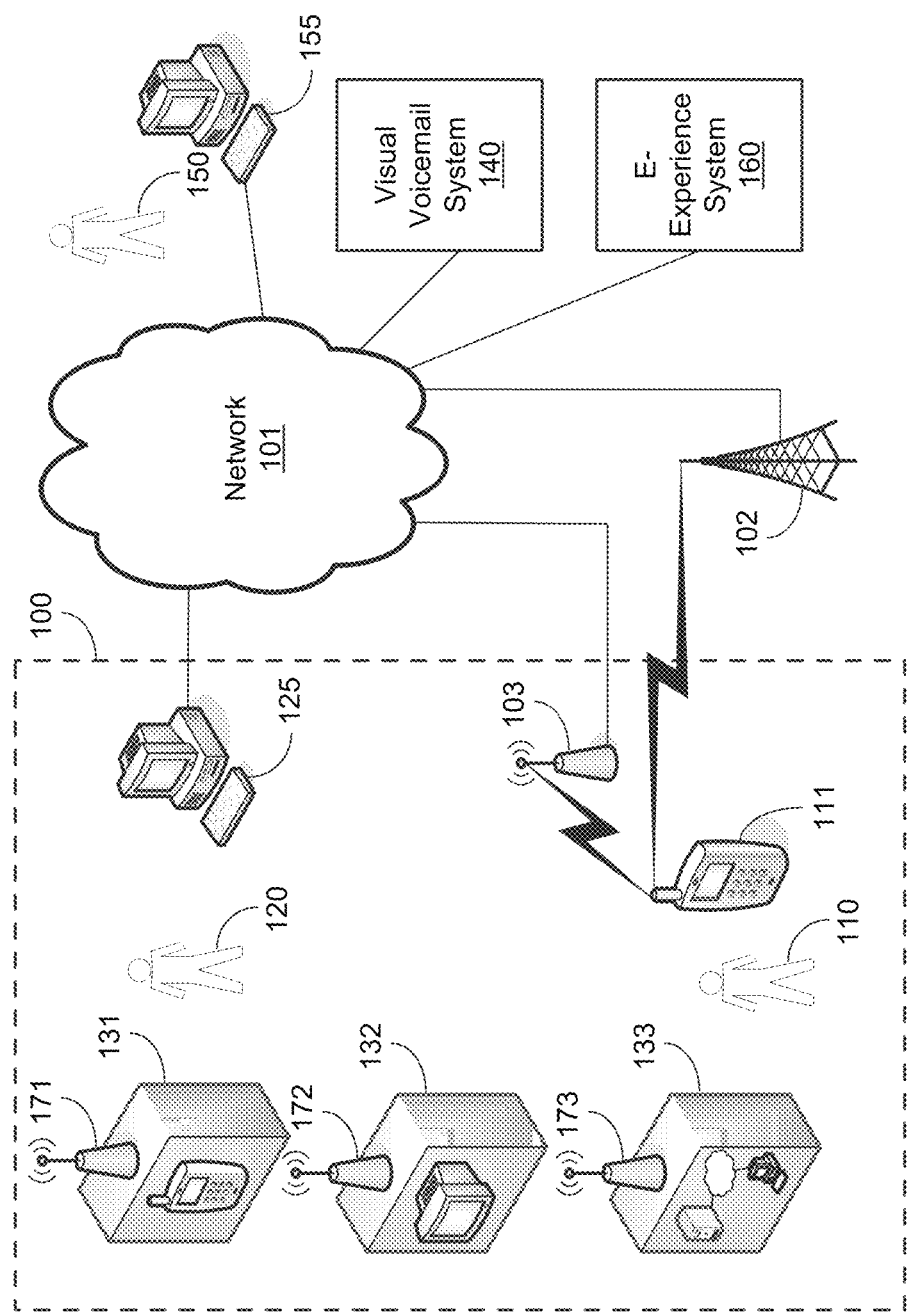
FIG. 1 illustrates a non-limiting exemplary environment in which interactive personalized e-Experience system using visual voicemail methods and systems may be implemented.

FIG. 1 illustrates an environment in which one or more embodiments of the disclosed systems and methods for providing an interactive personalized experience using visual voicemail systems may be implemented. User 110 may be operating wireless device 111 and may be present in shopping area 100. Wireless device 111 may be any type of wireless mobile communications device, including a mobile telephone, smart phone, personal data assistant (PDA), mobile computer, wireless email device, or any combination thereof. Alternatively, while wireless device 111 as illustrated represents wireless mobile communications devices, wireless device 111 may also represent a wired device, such as a landline telephone, computer, email device, or any other communications device or any combination thereof. Shopping area 100 may be any retail store, or any area, indoors and/or outdoors, where shopping or interaction with others of any form may take place. Representative 120 may be a person employed by the owner or operator of area 100. Computer 125 may be configured in area 100 and may be owned or operated by representative 120 or other employees of or people associated with the owner or operator of area 100. Computer 125 may be a laptop computer, a desktop computer, a mobile computer, or any computing device of any type, and may be configured with any operating system, software, hardware and peripheral devices. All such embodiments are contemplated as within the scope of the present disclosure.

Each of wireless device 111 and computer 125 may be configured to communicate with network 101 using any communications means. Network 101 may be any type of network capable of providing wireless and/or wired data and/or voice communications services to devices of any type. Network 101 represents any number of interconnected networks that may be composed of any number and type of wired and/or wireless network devices. Network 101 may enable devices 111 and 125 to communicate with other devices accessible via network 101, including visual voicemail system 140, computer 155, web servers, and mobile communications devices such as cell phones and mobile computing devices. Such communication may be voice, data, or a combination thereof. All such embodiments are contemplated as within the scope of the present disclosure.

In one embodiment, each of devices 111, 125, and 155 may be configured to access and/or communicate with visual voicemail system 140 via base station 102, which may be any type of base station, eNodeB, or other means for relaying wireless communications and converting data and/or voice messages between wireless and wired networks. Base station 102 may facilitate communication with network 101 for wireless device 111. Alternatively, wireless hub 103 may be configured to communicate with wireless devices such as wireless device 111, and may provide some or all of the functionality that is commonly provided by base stations. Wireless hub 103 may communicate using cellular technology or wide area wireless technology (GSM, CDMA, WIMAX, LTE, LTE Advanced, etc.) and/or local area wireless technology (e.g., IEEE 802.X standards, WiFi, etc.) User 110 may operate wireless device 111 to access his or her voicemail data using a visual voicemail client configured on wireless device 111. Such a visual voicemail client may be software, hardware, or any combination thereof. Alternatively, visual voicemail client functionality may be provided by a web server and accessed by a user through a web browser executing, for example, on wireless device 111. Any other permutation of combination of these embodiments, and any embodiments which provide similar functionality, are contemplated as within the scope of the present disclosure.

User 110 may be at area 100 in order to examine products and/or obtain more information about goods and services provided by an owner or operator of area 100. For example, products 131, 132, and 133 may be offered by an owner or operator of area 100. These products may be any type of good or service. For purposes of illustration only and not limitation, product 131 may be a wireless device such as a mobile telephone, product 132 may be a cable television service, and product 133 may be an internet service. Any other products, goods, or services, may be offered, displayed, or otherwise associated with area 100 and/or an owner or operator of area 100, and all such embodiments are contemplated as within the scope of the present disclosure.

The owner or operator of area 100 may detect the presence of wireless device 111 within or proximate to area 100. This may be accomplished by detecting short range wireless signals, such as a WiFi signal, from wireless device 111 on an appropriately configured device, such as wireless hub 103. Alternatively, wireless hub 103 may be configured to detect cellular technology or wide area wireless technology, and may detect the presence of wireless device 111 by detecting typically cellular communications signals. In another alternative, devices within network 101 may determine or otherwise acquire location information for wireless device 111 and determine that wireless device 111 is in or proximate to area 100. For example, area 100 may be a store that is operated or owner by the organization, company, etc., that owns and operates network 101. Thus, a device on network 101 may be configured with data regarding the locations of such stores, such as e-Experience system 160. Alternatively, e-Experience system 160 may be operated by the owner or operator of the store at area 100, and may derive location information for wireless device 111 from network 101 or from any other source. Once location information is determined for wireless device 111, it can be compared to a database or other information on e-Experience system 160 or any other device to determine whether wireless device 111 is in or proximate to area 100. Any other method of determining that wireless device 111 is in or proximate to area 100 may be used, and all such embodiments are contemplated as within the scope of the present disclosure.

In some embodiments, data detected from wireless device 111 or received automatically or in response to a query, may be used to identify wireless device 111, user 110, and/or an account or other data associated with wireless device 111 or user 110. Such data may include a telephone number of wireless device 111, an International Mobile Subscriber Identity (IMSI), an internet protocol (IP) address, a Media Access Control (MAC) address, an account number, or any other data that may be used to identify a user, an account, and/or a wireless device. Once identifying data is received, account, user, and/or device information may be obtained, for example by any of e-Experience system 160, visual voicemail system 140, computer 125, or any device communicatively connected to network 101. This obtained information may be provided to the owner or operator of area 100 or a representative associated therewith, such as sales associate 120, using any means, such as presenting such information on computer 125. Such information may also be used to construct and/or generate visual voicemail content for visual voicemail messages transmitted to wireless device 111 as described in further detail herein.

Upon determining that wireless device 111 is in or proximate to area 100, a visual voicemail message may be generated and the message, or a notification of the message, may be transmitted to wireless device 111. The visual voicemail message may be generated by visual voicemail system 140 in response to receiving a notification that wireless device is in or proximate to area 100, or in response to any other instruction to create and transmit such a message. The instruction to create and transmit the message may be transmitted to visual voicemail system 140 by a device dedicated to providing e-Experience communications, such as e-Experience system 160. e-Experience system 160 may provide the content for such a visual voicemail message, or may simply provide an instruction to visual voicemail system 140 to provide a particular message type that may already be configured on visual voicemail system 140. The content of such a message may include a greeting, an offer for goods or services, a listing of specials or sales, a request to know whether assistance is required, or any other information.

Figure 2A:
FIG. 2a illustrates a non-limiting exemplary visual voicemail content that may be presented to a user in an interactive personalized e-Experience system using visual voicemail.

For example, referring now to FIG. 2*a*, a visual voicemail message transmitted to wireless device 111 may include content 201 that may be presented to user 210 upon receipt of or request for the visual voicemail message, in an embodiment through a locally configured visual voicemail client or an internet accessible interface to visual voicemail system 140 or any other visual voicemail facilitating means. Content 201 may include greeting 210. Greeting 210 may be generic in nature and may be intended to greet any customer or potential customer entering area 100. Alternatively, greeting 210 may be customized for particular customers that are identified by a system such as e-Experience system 160. Content 201 may also include sale information 211. Sale information 211 may include information on ongoing sales or specials, newly available products or services, general sales information such as pricing and terms, or any other information that a merchant or operator of an area such as area 100 may wish to convey to customers and potential customers.

Content 201 may also include interactive content, such as interactive content 212. Within interactive content 212 may be controls that user 110 may activate through the operation of wireless device 111, in an embodiment in conjunction with external devices such as visual voicemail server 140 and/or e-Experience system 160. Such controls may take the form of soft buttons, virtual buttons, graphical elements mapped to physical buttons, or any other control configured to accept user input. Such controls, when activated by a user, may allow a user to transmit a request for a sales associate to provide assistance in person. Such a request may then be forwarded to a device, such as computer 125 in area 100, and may then be detected by a sales associate such as sales associate 120. Note that such a request may include user 110's name, account number, or some other identifying information to make it easier to locate user 110, and/or to allow sales associate 120 to determine services and products purchased by user 110 in the past or any other information that may be useful to sales associate 120.

In order for sales associate 120 to locate wireless device 111 and user 110, in one embodiment upon activation of a "Request Associate" control, wireless device 111 may receive an instruction to light an external light, sound an alarm, activate a ringer, or any activate any other means that may be used to provide an externally detectable indication that wireless device 111 is the device operated by user 110 requesting in-store assistance. Such an instruction may be provided to wireless device 111 by a visual voicemail client on wireless device 111, for example, by the visual voicemail client executing software in response to detecting activation of a "Request Associate" control. Alternatively, such an instruction may be transmitted to wireless device 111 from an external device, such as visual voicemail server 140 or e-Experience system 160. In other embodiment, sales associate 120 may have been provided with user 110's name, and may simply ask for user 110 in area 100, for example by paging user 110 or querying customers in area 100.

Note that for a control such as a "Request Associate" control, the request generated by activation of such a control may be queued and provided to sales associate 120 in turn, after similar requests that were made earlier have been serviced. In such circumstances, user 110 may be notified via wireless device 111 that user 110 is, for example, second in line for assistance, or number 4 of 5 customers waiting, etc. Such a notification may be presented to user 110 via a visual voicemail message that is presented on a visual voicemail client or visual voicemail interface of any type.

In an embodiment, interactive content 212 may include a control to locate a product. Upon activation of such a control, the user may be provided with an interface to select a product or identify a product for locating. Another visual voicemail message may be transmitted to wireless device 111 with instructions about how to locate the requested product or information on where the product may be located in or proximate to area 100. For example, if user 110 is interested in product 131, user 110 may be provided information that product 131 is in the right rear corner of area 100. Product information as described herein may also be provided to user 110 along with location information. Note that products and/or their associated displays or display areas may have wireless hubs, such as wireless hubs 171, 172, and 173, or other detection means that will allow a determination that wireless device 111 is proximate to such products. In an embodiment, activation of a "Locate Product" control may activate a hot/cold system or software that, in conjunction with wireless hubs may assist user 110 in locating the product. For example, an indication of cold, warmer, hot, etc., may be presented to user 110 on wireless device 111 as user 110 gets nearer to or farther from product 131. In one embodiment, a hub such as wireless hub 171 may determine proximity by measuring signal strength or other signal characteristics of a signal detected from wireless device 111.

In another embodiment, interactive content 212 may include a control to get product information. Upon activation of such a control, user 110 may be provided with an interface to select a product or identify a product for which information is desired. Another visual voicemail message may be transmitted to wireless device 111 with information about the requested product. Note that such information may also include product location information as described above. Alternatively, a user may scan a bar code with an appropriately configured wireless device 111, and product information may be obtained and provided based on the bar code. In another alternative, user 110 may operate a camera on wireless device 111 and capture an image of a product which may then be used to determine the specific product and obtain product information. Any other means of identifying a product about which information is desired may be used, and all such means are contemplated as within the scope of the present disclosure. The processes used to identify and locate information for a product may be implemented on any network device, such as e-Experience system 160 or visual voicemail system 140, on wireless device 111, or on any other device or any combination of devices.

In another embodiment, interactive content 212 may include a control that will indicate that user 110 is just browsing. Upon activation of such a control, a message may be sent to a device at area 100, such as computer 125, that informs sales associates that user 110 does not need any assistance at the present time. After such a control is activated, the visual voicemail message may be deleted and no further interaction may be provided via the visual voicemail system. Alternative, content 201 or similar content may remain active on wireless device 111 so that if user 110 determines that assistance or information is desired, user 110 can activate another control in content 201, such as a control within interactive content 212.

Rather than using controls such as those that have been described with regard to interactive content 212, user 110 may operate wireless device 111 to reply to the visual voicemail message received after it has been determined that wireless device 111 is within or proximate to area 100. The reply composed by user 110 may indicate whether user 110 desires sales associate assistance, product information or location, or any other information. Alternatively, the activation of controls within interactive content 212 may generate a reply visual voicemail message that may then be transmitted, automatically, for example upon activation of a control, or upon user 110 instruction, to visual voicemail system 140. Any other means of responding to a visual voicemail and/or obtaining user preferences and/or desires may be used, and all such means are contemplated as within the scope of the present disclosure.

Referring again to FIG. 1, user 110 may be provided with information or queried based on user 110's specific location within area 100 and/or user 110's proximity to products within or proximate to area 100. In one embodiment, each of products 131, 132, and 133, or product displays for such products, may be equipped or associated with a wireless hub such as wireless hubs 171, 172, and 173. Such wireless hubs may be in communication with a system or device, such as computer 125, e-Experience system 160, and/or visual voicemail system 140, and may also be in communication with each other. By periodically measuring signal strength and/or other characteristics of signals transmitted from wireless device 111, these hubs, and in one embodiment wireless hub 103, may report information to computer 125, e-Experience system 160, and/or visual voicemail system 140 that may allow such devices to determine a more precise location for wireless device 111. This may be accomplished using any means, including any form of triangulation. If it is determined that user 110 is proximate to a particular product, then a visual voicemail message may be transmitted to wireless device 111.

For example, in an embodiment, internet service product 133 may be a display that provides information about available internet service. By using signal strength measurement and triangulation techniques, computer 125 or e-Experience system 160 may determine that wireless device 111 is more proximate to product 133 than to any other product. Thus, a visual voicemail message may be generated, in one embodiment by visual voicemail system 140 upon instruction received from computer 125 or e-Experience system 160, that provides additional details or internet service product specific options. This visual voicemail message may be transmitted to wireless device 111 for presentation to user 110. Likewise, if user 110 is more proximate to product 132, a visual voicemail message may be generated that provides additional details or cable television service product specific options. Similarly, if user 110 is more proximate to product 131, a visual voicemail message may be generated that provides additional details or wireless device product specific options. Information and option for any type of product may be conveyed using a visual voicemail system as described herein.

Figure 2B:
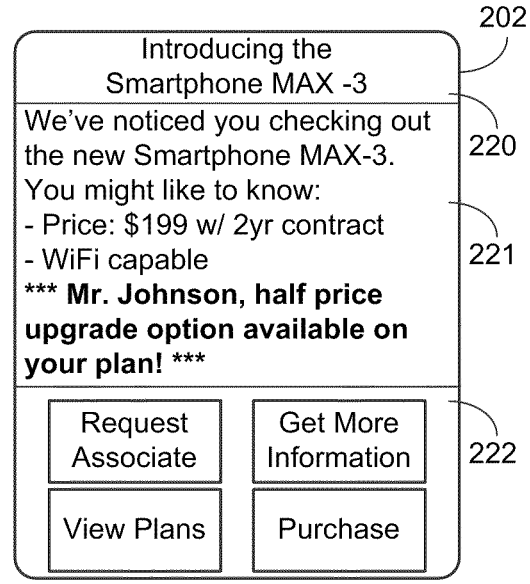
FIG. 2b illustrates another non-limiting exemplary visual voicemail content that may be presented to a user in an interactive personalized e-Experience system using visual voicemail.

Referring now to FIG. 2b, exemplary non-limiting product-specific visual voicemail content 202 is illustrated. Greeting 220 may identify the product to which user 110 is most proximate, allowing user 110 to identify the product with which the additional information in content 202 is associated. Product information 221 may be provided with content 202. Product information 221 may include basic product information that may of interest to the largest number of shoppers, such as price, contract requirements, major hardware, etc. For product such as internet service, cable television service, or cellular service, details such as programming options, available bandwidth, number of minutes of use, charges per minute, etc. may be provided in product information 221. Note also that customer specific information may also be presented. If user 110, identified upon entry in area 100 as described above, has any characteristics or a customer profile that is especially applicable to a product to which user 110 is currently more proximate, a message providing specific information for user 110 may be presented. For example, user 110 may have a cellular service contract that allows user 110 to purchase certain wireless devices for half price after a period of the contract has expired. If it is determined, for example by computer 125 or e-Experience system 160, that the product proximate to user 110 is one of the qualifying half price devices, product information 221 may include a notification to that effect. Any other information, generic or customer or user specific, may be presented in product information 221.

Content 202 may also include interactive content, such as interactive content 222. Within interactive content 222 may be controls that user 110 may activate through the operation of wireless device 111, in an embodiment in conjunction with external devices such as visual voicemail server 140 and/or e-Experience system 160. Such controls may take the form of soft buttons, virtual buttons, graphical elements mapped to physical buttons, or any other control configured to accept user input. Such controls, when activated by a user, may allow a user to transmit a request for a sales associate to provide assistance regarding the product proximate to user 110 in person. Such a request may then be forwarded to a device, such as computer 125 in area 100, may include information identifying the particular product proximate to user 110, and may be detected by a sales associate such as sales associate 120, who may provide assistance in person or locate a sales associate who specializes or has been trained in the particular product proximate to user 110. Note that such a request may include user 110's name, account number, or some other identifying information to make it easier to locate user 110, and/or to allow sales associate 120 to determine services and products purchased by user 110 in the past or any other information that may be useful to sales associate 120. Alternatively, any of the customer locating means and methods described above with regard to FIG. 2a may also be implemented.

In another embodiment, interactive content 222 may include a control to get additional product information. Upon activation of such a control, user 110 may be provided with additional information and/or a webpage or link to a web site with additional information on the product to which user 110 is most proximate. Another visual voicemail message may be transmitted to wireless device 111 with such information or links about the requested product. The processes used to identify and locate additional information for a product may be implemented on any network device, such as e-Experience system 160 or visual voicemail system 140, on wireless device 111, or on any other device or any combination of devices.

In an embodiment, interactive content 222 may include a control to get information related to services available for the product to which user 110 is most proximate. For example, if user 110 is most proximate to a wireless device, a control may be presented in interactive content 222 that allows user 110 to request information about wireless service plans that are available to service the wireless device. Upon activation of such a control, user 110 may be provided with information and/or a webpage or link to a web site with information on the plans or products related to the product to which user 110 is most proximate. Another visual voicemail message may be transmitted to wireless device 111 with such information or links about the related plans or products. The processes used to identify and locate related plan or product information for a product may be implemented on any network device, such as e-Experience system 160 or visual voicemail system 140, on wireless device 111, or on any other device or any combination of devices.

In another embodiment, interactive content 222 may include a control to purchase the product to which user 110 is most proximate. Upon activation of such a control, user 110 may be provided with instruction on how to purchase the product, for instance, location information for a cash register or sales associate. Alternatively, upon activation of such a control, user 110 may be provided with an interface on wireless device 111 that allows user 110 to pay for the product by using wireless device 111. Such an interface may be generated automatically on wireless device 111 in response to activation of such a control, or a visual voicemail message may be generated and transmitted to wireless device 111 containing a payment interface or a link to such an interface. For example, a website payment interface may be generated and presented to user 110 allowing user 110 to pay for the product and therefore avoid lines at a cash register or having to pay in the store at area 100. In either of these embodiments, activation of a "Purchase" control may generate a message that is sent to a device in area 100, such as computer 125, that notified a sales associate, such as sales associate 120, that user 110 wants to purchase or has purchased a product, thereby allowing the sales associate to obtain a physical product, or information, documentation, etc. related to a service or non-physical product, and provide such to user 110 without requiring user 110 to first track down the sales associate. The processes used allow a customer to purchase a product and/or notify a sales associate of intent to purchase or completion of a purchase of a product may be implemented on any network device, such as e-Experience system 160 or visual voicemail system 140, on wireless device 111, or on any other device or any combination of devices.

Figure 2C:
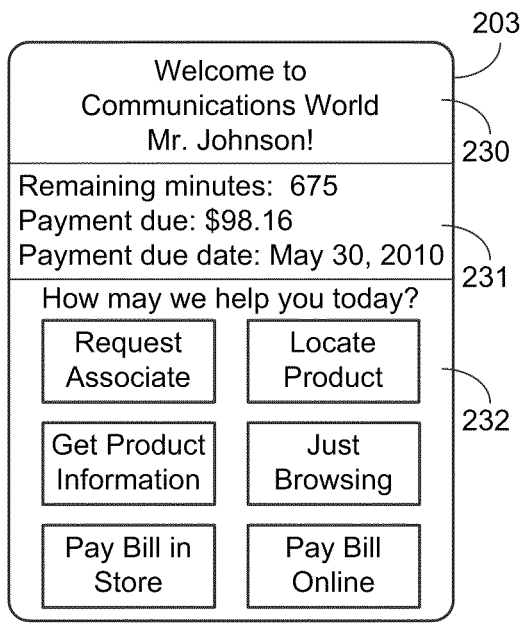
FIG. 2c illustrates another non-limiting exemplary visual voicemail content that may be presented to a user in an interactive personalized e-Experience system using visual voicemail.

In some embodiments, a visual voicemail message transmitted to wireless device 111 upon detection of wireless device 111 within or proximate to area 100 may include personalized options. This may be enabled by determining the user or device identity, account, or other data associated with wireless device 111 upon detecting the device. Referring now to FIG. 2c, a personalized visual voicemail message that may include content 203 may be presented to user 110 via a visual voicemail client or an internet accessible interface to visual voicemail system 140 or any other visual voicemail facilitating means. Content 203 may include a greeting 230 comprising identifying information for user 110, such as the user's name, that allows the message to be more personal. Content 203 may also include user-, device-, and/or account-specific information 231. Specific information 231 may include any information that may of use to a user, such a number of minutes remaining in a wireless service plan, any outstanding balance due and associated due dates, types of devices included in the account, available upgrades and options specifically for the account of the user, etc.

Content 203 may also include interactive content, such as interactive content 232. Within interactive content 232 may be controls that user 110 may activate through the operation of wireless device 111, in an embodiment in conjunction with external devices such as visual voicemail server 140 and/or e-Experience system 160. Such controls may take the form of any control as described herein, and may function in any manner as described herein. Such controls may include any control described herein such as a "Request Associate" control, a "Locate Product" control, a "Get Product Information" control, and a "Just Browsing" control.

In some embodiment, the controls of interactive content 232 may include bill payment controls. Bill payment controls may allow user 110 to pay an outstanding balance using wireless device 111 by selecting a "Pay Bill Online" control, in some embodiments using any payment interface as described herein, including software executing on wireless device 111 and a web-based interface accessed via wireless device 111. Alternatively, area 100 may be configured with devices that allow customer payment using wireless devices. For example, computer 125 may provide payment functionality through a WiFi network to allow short range wireless devices to make payments. Alternatively, computer 125 or any other device at area 100 may interact with wireless device 111 via short range wireless signals to allow wireless device 111 to access payment servers or devices via network 101. Any method and means of providing a payment interface is contemplated as within the scope of the present disclosure.

A bill payment control may also allow user 110 to pay a bill in person at area 100. For example, activation of a "Pay Bill in Store" control may generate a message that notifies staff on the premises, such as sales associate 120, that user 110 wishes to make a payment. Here again, such requests may be queued, and user 110 may be notified in a subsequent visual voicemail message that user 110 is in a queue and user 110's position in such a queue. Alternatively, activation of a "Pay Bill in Store" control may allow sales associate 120 to have user 110's information at hand when user 110 approaches to make a payment. Any other means of organizing and arranging bill payment using systems and methods as described herein are contemplated as within the scope of the present disclosure.

Note that a user profile of user 110 may be used to determine the data that is to be included in personalized visual voicemail generated upon detection of, for example, wireless device 111 within or proximate to area 100. The user profile may or may not include user configurable preferences, and may be stored on any device or multiple devices, including wireless device 111, e-Experience system 160, and/or visual voicemail system 140. For example, in one embodiment, a user profile may include an indicator of an outstanding bill or payment due. Where the indicator indicates that a payment is due, information regarding the payment may be included in a personalized visual voicemail generated upon detection of wireless device 110. Alternatively, where the indicator indicates that now payment is presently or soon due, such billing information may be excluded from a generated personalized visual voicemail message. In other embodiments, user 110 may have a service plan that allows for unlimited usage of wireless service, in which case a personalized visual voicemail generated upon detection of wireless device 111 may contain no information regarding a number of remaining minutes of wireless service. Alternatively, if user 110 has a service plan with a limited number of minutes per month available, the remaining number of minutes may be presented in a personalized visual voicemail message.

User profiles may also include information relating to specific devices owned or operated by a user. For example, wireless device 111 may be a wireless device that is compatible or configured with a first visual voicemail client that supports certain media types. The user profile for user 110 may indicate that visual voicemail messages intended for presentation on wireless device 111 must not include content that is not supported by the visual voicemail client configured on wireless device 111. Alternatively, wireless device 111 may not support certain types of media, and the user profile for user 110 may indicate that no visual voicemail messages included unsupported media types should be generated for presentation on wireless device 111. Any other characteristics and/or configurations of wireless device 111 and/or other devices may be included in a user profile and used to generate visual voicemail messages, and all such embodiments are contemplated as within the scope of the present disclosure.

In embodiments where a user profile may include user-configurable preferences, user 110 may configure a system, such as e-Experience system 160 or visual voicemail system 140, with user preferences for visual voicemail communications. For example, user 110 may operate a visual voicemail client or another interface to e-Experience system 160 or visual voicemail system 140 configured on wireless device 111 or another device to set user preferences specifying the data that is to be included in personalized visual voicemail generated upon detection of, for example, wireless device 111 within or proximate to area 100. User 110 may set a preference to be greeted with remaining minutes in a cellular service plan, payment due dates, payment due amounts, current status of account, applicable coupons and/or sales, identification of devices covered on a cellular service plan, a summary of all services being purchased by user 110 from an owner or operator of area 100, etc. Any information may be included in a personalized visual voicemail message, and any such information may be user configurable. All such embodiments are contemplated as within the scope of the present disclosure.

Figure 2D:
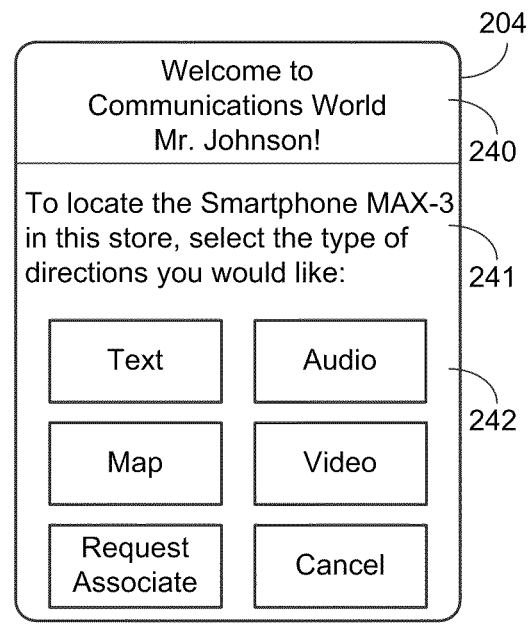
FIG. 2d illustrates another non-limiting exemplary visual voicemail content that may be presented to a user in an interactive personalized e-Experience system using visual voicemail.

Because visual voicemail systems may allow multimedia content to be distributed and presented to users, visual voicemail messages may be used to present content in various formats. For example, referring now to FIG. 2d, if user 110 selected an option in a previously received voicemail to locate a particular product, user 110 may receive a subsequent visual voicemail message including content 204. Content 204 may include a greeting such as greeting 240 that may include any content as described herein, including personalized content. Content 204 may also include information 241 that may request that user 110 select an option from available interactive content 242 controls. For example, information 241 may acknowledge that user 110 has previously selected a control requesting the location of a particular product or service within area 100 and request that user 110 select from among the controls of interactive content 242 the form in which user 110 would like to receive directions to the requested location. Interactive content 242 may include a control for receiving text directions, which, when activated by user 110, may generate a reply visual voicemail message that may be transmitted to visual voicemail system 140 and/or e-Experience system 160 that instructs visual voicemail system 140 and/or e-Experience system to transmit a visual voicemail message to wireless device 111 containing text directions to the location of the requested product or service within area 100.

Alternatively, content 204 may be contain, or be associated with, one or more of the forms of directions offered in interactive content 242, and may simply present such directions upon activation of the corresponding control. For example, interactive content 242 may include an option to obtain audio directions (e.g., automated voice directions) and content 204 and/or the visual voicemail message with which content 204 is associated may also include an audio file containing the audio directions. Upon detection of the activation of such a control, wireless device 111, and/or the visual voicemail client configured thereon, may activate a program, software, hardware, or a combination thereof to execute the audio file. Similarly, video directions may be available and may be stored locally on wireless device 111 for execution or may be stored remotely. Alternatively, directions in any form may not be generated at all until a form of directions is selected, thereby reducing resource usage by only generated directions in the form that is actually requested by user 110.

Note that rather than selecting a form of directions, user 110 may have selected a user preference, or a preference may be configured by default or otherwise limited, to have directions presented, in one embodiment automatically, in a particular form. For example, user 110 may have configured a user preference that directions should always be presented in text form. Alternatively, visual voicemail system 140 and/or e-Experience system 160 may be configured to automatically provide location directions in a particular format by default. Note that any information presented to user 110 in a visual voicemail message may be in any media type, and user 110 may be presented with the option to obtain any information in any media type available. User preferences and/or defaults may be used for media types and particular information types. Also note that any content presented to user 110, such as content 204, may include options to cancel the associated activity or to request the assistance of an associate. Any default or always-present options and/or controls may be configured on visual voicemail messages. All such embodiments are contemplated as within the scope of the present disclosure.

Figure 3:
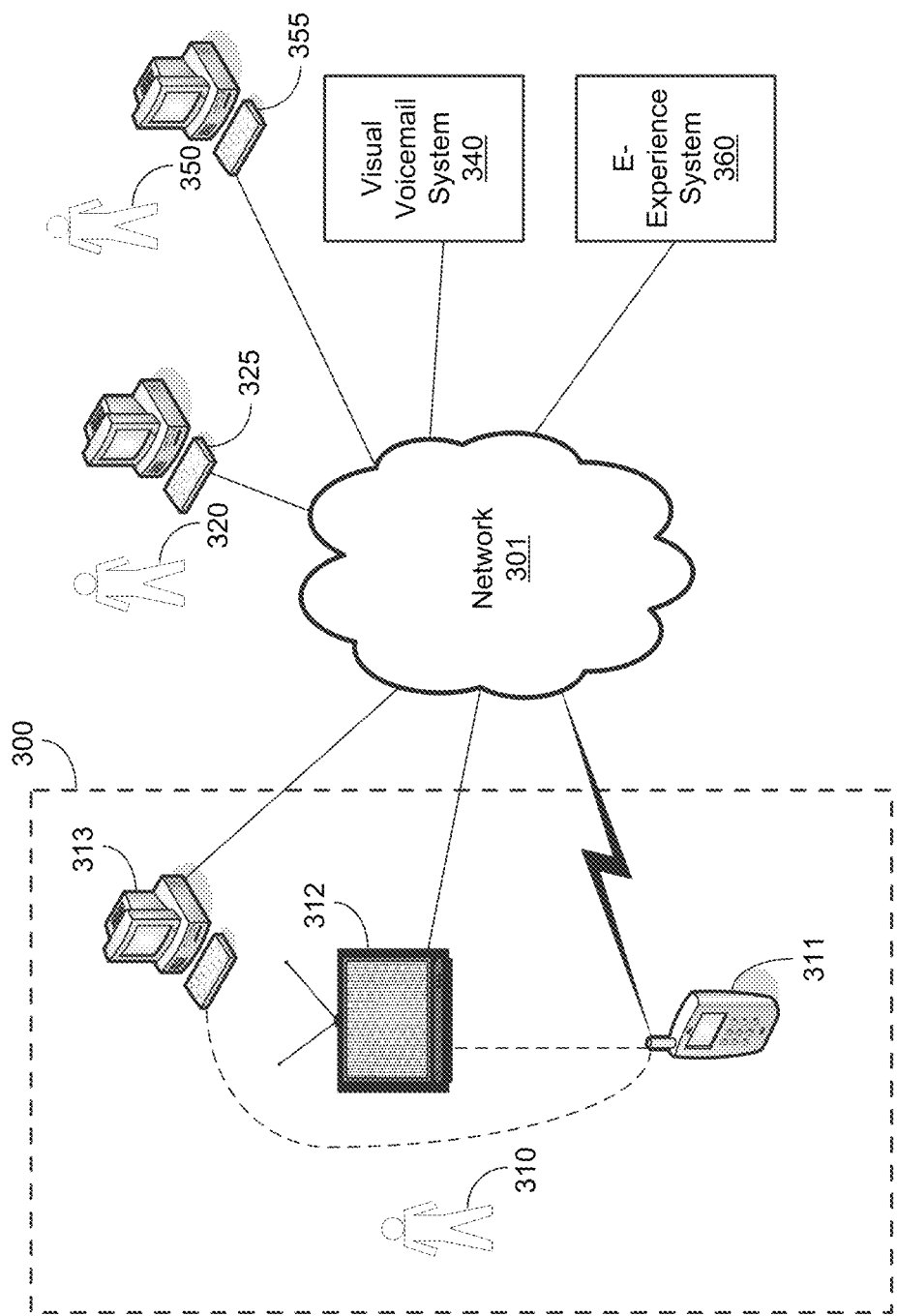
FIG. 3 a non-limiting exemplary environment in which interactive personalized e-Experience system using visual voicemail may be implemented.

Referring now to FIG. 3, multiple employees or others associated with a vendor or provider of goods and/or services may collaborate in order to service a customers. User 310 may be operating wireless device 311 that may be configured with a visual voicemail client having certain capabilities. Wireless device 311 may be configured to communicate with network 301, which may be any type of wired, wireless, or combination of wired and wireless network. Network 301 may facilitate communication between various devices, such as wireless device 311, visual voicemail system 340, e-Experience system 360, and vendor computers 325 and 355. User 310 may operate wireless device 311 to request a service, data, information, etc. from a service provider or vendor using a visual voicemail system.

For example, user 310 may have been presented with a visual voicemail message that includes interactive content that allows user 310 to request more information about a product via activation of a control. Upon activation of a "Get Product Information" control, a visual voicemail message requesting product information may be generated and transmitted to e-Experience system 360, or e-Experience system 360 may otherwise be notified that user 310 desires further product information. e-Experience system 360 may be configured, in an embodiment, to provide, in response to such a request, product specifications, product pricing, information on service plans for such a product, and location information for the product. Location information may include the location of the product within a particular store, such as area 100 of FIG. 1, or a listing of one or more stores that carry the product. In order to gather this information, e-Experience system 360 may request such information from multiple sources. For example, e-Experience system 360 may request product specification and prices from agent 320 via computer 325, where agent 320 may be employed in a product group of an organization. e-Experience system 360 may also request service plan information and location information for the product from agent 350 via computer 355, where agent 350 may be employed by a regional management group or service plan group of an organization.

Agents 320 and 350 may operate their respective computers to generate separate visual voicemail messages for transmittal to wireless device 311 in response to receiving the request for information from e-Experience system 360. Alternatively, agents 320 and 350 may each transmit the requested information to e-Experience system 360, which may then gather and integrate the information into a single visual voicemail message that is then sent to wireless device 311. Agents 320 and 350 may also communicate with one another or otherwise work in a collaborative to address a customer request. For example, if user 310 is requesting technical support rather than product information, agent 320 research handset issues for wireless device 311 while agent 350 may research network issues that may affect wireless device 311. The results of such research may separately be transmitted to wireless device 311 or may be gathered into a single communication and transmitted to wireless device 311 as a single visual voicemail message. Additional agents may work collaboratively to address customer issues and any alternative arrangement for receiving customer requests, addressing such requests, and responding to such requests may be implemented. All such embodiments are contemplated as within the scope of the present disclosure.

In some embodiments, visual voicemail messages may be available on multiple devices. For example, user 310 may have recently visited a service provider or vendor premises, such as area 100 of FIG. 1. While at the premises, user 310 may have requested video information about a device that user 310 may be considering for purchase. User 310 may decide to return home, for example to area 300, and view the video. When at area 300, user 310 may desire to view the video information on an alternative device other than wireless device 311, for example because the screen on wireless device 311 is much smaller than that on user's computer 313 and user's television 312.

In one embodiment, one or both of user's computer 313 and user's television 312 may be configured with a visual voicemail client that enables such devices to communicate with visual voicemail system 340 and/or e-Experience system 360. Also, one or both of visual voicemail system 340 and/or e-Experience system 360 may be configured to communicate using network 301. User 310 may then operate either of user's computer 313 and user's television 312, and a visual voicemail client configured thereon, to retrieve the visual voicemail containing the video information from visual voicemail system 340 and/or e-Experience system 360 and view the video information on user's computer 313 or user's television 312.

Alternatively, rather than each of user's computer 313 and user's television 312 having a visual voicemail client, these devices may communicate directly or indirectly with wireless device 311, which may transmit the visual voicemail message in its entirety or just the video information portion of the visual voicemail message directly to either user's computer 313 or user's television 312, or both. User's computer 313, user's television 312, and/or wireless device 311 may be configured with near-field or short range wireless functionality, such as WiFi, Bluetooth®, etc., and may communicate directly with one another using such technology.

Alternatively, either user's computer 313 or user's television 312 may be hardwired to a local area network configured in area 300, and a wireless communications hub or router may also be configured on such a network allowing wireless device 311 to communicate with user's computer 313 and/or user's television 312 via such a hub or router. In yet another embodiment, user 310 may establish a hardwired connection between either user's computer 313 or user's television 312 and wireless device 311, and communication between such devices may take place over the hardwired connection. Once the video information is loaded or otherwise configured for viewing on user's computer 313 or user's television 312, user 310 may then watch the video information on the device in which it is loaded. Note that any information can be transferred, transmitted, or otherwise made available to any alternative device using any effective means, and all such embodiments are contemplated as within the scope of the present disclosure.

Figure 4:
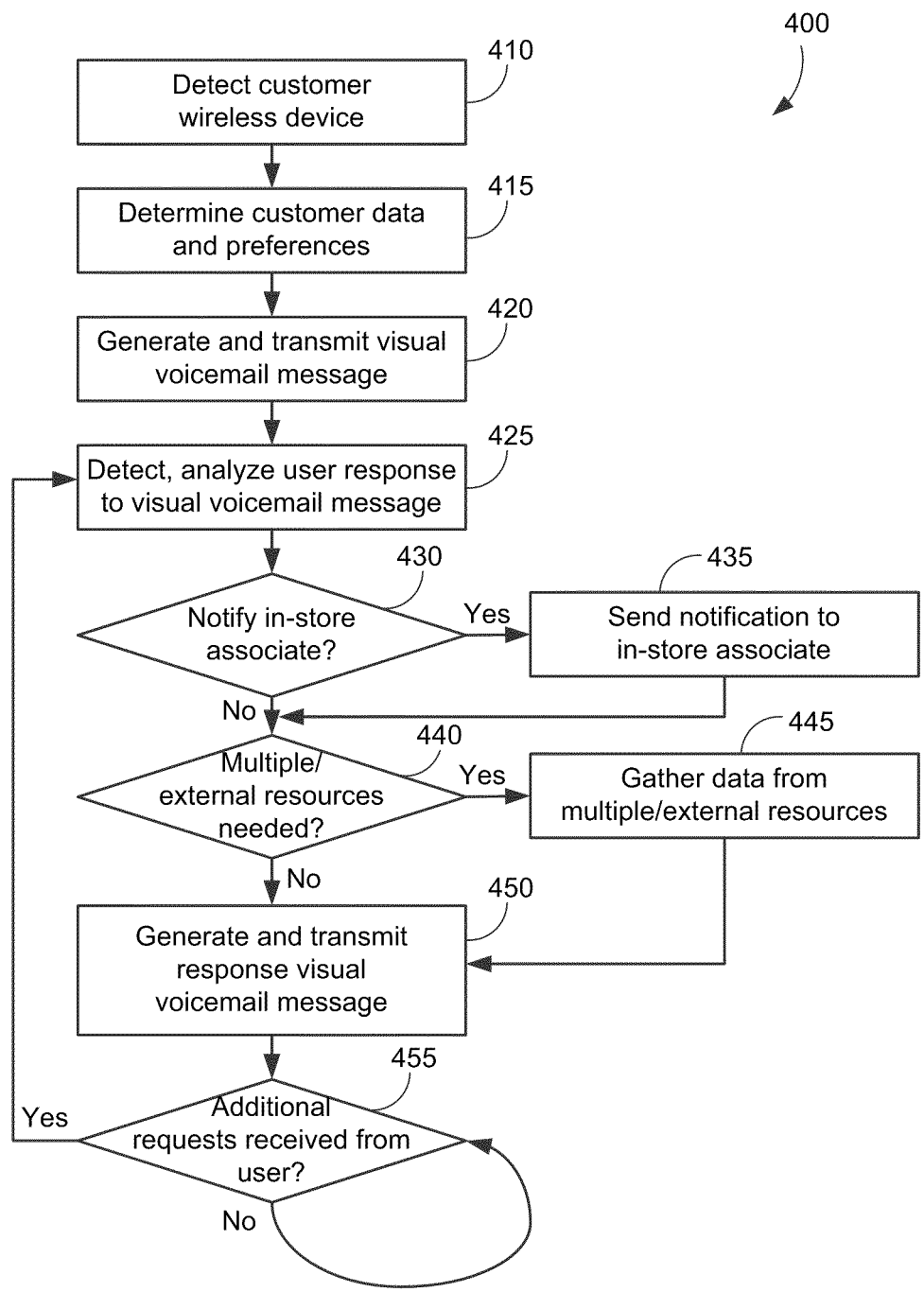
FIG. 4 illustrates a non-limiting exemplary method for implementing an interactive personalized e-Experience system using visual voicemail.

FIG. 4 illustrates exemplary, non-limiting method 400 of implementing the disclosed subject matter. Note that one or more of the actions performed in method 400 may be performed without performing the other actions disclosed, and any combination of the actions disclosed in method 400 may be performed in any order. The actions of method 400 may be performed by one or more devices operating separately or in combination. The action of method 400 may be embodied in instructions contained on computer-readable media, including non-transitory media such as computer-readable disks, memory, other computer-readable storage devices, etc.

At block 410, a wireless device operated by a customer, prospective customer, or any other person on a premises may be detected by an entity implementing the present subject matter may be detected. Such detection may take any form as described herein, including detecting short range or near-field communication attempts or queries, or any other effective means of wirelessly detecting a device. Including in block 410 may be a determination, extraction, derivation, or other means of obtaining user, device, account, or other identifying information from detected signals. For example, a MAC address or IMSI may be detected in a wireless device signal and extracted for use in other activities, such as at block 415. Note that the detection at block 410 may instead be the detection of the user wireless device as being most proximate to a particular product or product display as described above. Thus, a wireless hub or similarly configured device may determine, in one embodiment working cooperatively with other wireless hubs and/or other devices in an area, that the detected wireless device is most proximate to the wireless hub. This may affect the content of visual voicemail messages transmitted to the user device at other blocks of method 400.

At block 415, customer data and/or preferences may be determined, in one embodiment using customer, user, account, device, or other identifying data derived from a signal detected at block 410. This may be performed by looking up customer preferences and data in a database based on the identifying data. Customer preferences may include any preferences described herein, or any other preferences that a user or anyone associated with an account may provide. Alternatively, user preferences may be set to defaults or hard coded to specific values and may not be changeable by a user. Customer data determined may include account numbers, balances, payments due, due dates, or any other account, customer, device, and/or user data that may be presented to a user in visual voicemail message, or used in any manner in connection with any embodiment disclosed herein. In other embodiments, no customer or user specific data may determined. Alternatively, customer data or preferences may include, or may be limited to, a product or product display that is most proximate to the user device compared to other displays or products in the area. Thus, if it is determined that a user wireless device is most proximate to a particular wireless hub or similar device, the determination at block 415 may be a determination of the particular one or more products and/or services that are associated with the particular wireless hub or device.

At block 420, a visual voicemail message may be generated and transmitted. In one embodiment, a generic greeting message may be transmitted to any user device that has been detected. Alternatively, a personalized visual voicemail message may be generated, in an embodiment using data determined at block 415, and transmitted to a user device. Such a personalized or generic visual voicemail message may include any greetings, information, data, interactive content, controls, and/or options as described herein, or any other elements that may be included in a visual voicemail message. In another embodiment, the content of the visual voicemail message may include product and/or service specific information based on the wireless device of the user being most proximate to a particular product(s) and/or service(s). Such product data may be combined with user-specific data and/or other data to generate content for the visual voicemail message.

At block 425, a response to the message transmitted at block 420 may be detected. Such a response message may be analyzed and the appropriate next steps may be determined. For example, a response message may indicate the desire on the part of a user to locate a particular product or service, purchase a particular product or service, or to obtain further information on a particular product or service. In some embodiments, the response message may be a request for information on associated services or products, accessories, plans, etc. that may be related in any way to a particular product or service. Alternatively, a response message may indicate a user's desire to speak with a sales associate or to pay a bill. The response message received and analyzed at block 425 may be any type of message as described herein or any other type of message or communication than may received in response to a visual voicemail message.

At block 430 a determination may be made as to whether an in-store associate should be notified. For example, the response at block 425 may be a response requesting sales associate assistance or a request to pay a bill in person at a store. Alternatively, the response received at block 425 may not specifically indicate a desire to speak to a sales associate, but instead may contain data or information that a system, such as any of the e-Experience systems disclosed herein, determines should trigger a notification to an in-store associate. For example, a user may have responded to the visual voicemail of block 420 by requesting to cancel an account or return a product previously purchased. In some embodiments, a system may be configured to automatically notify a sales associate when such messages are detected. Any criteria for determining whether a sales associate or other personnel should be notified may be used, and all such embodiments are contemplated as within the scope of the present disclosure. At block 435, a sales associate or other personnel is notified using any means.

At block 440, a determination may be made as to whether one or more resources external to a system (e.g., an e-Experience system) are needed. For example, an e-Experience system may need to collect account status information or product details from another system in order to response to a user response message received at block 425. Multiple resources may be needed as disclosed herein, such as when two or more agents of a provider or vendor work cooperatively to gather information that will be used to response to a user request. The data may be gathered, received, or otherwise obtained in any manner at block 445. Alternatively, no data may be needed from any external sources, and all data may be locally stored or obtained, for example locally stored on an e-Experience system.

Regardless of the manner of obtaining data for a response visual voicemail message, at block 450, a response visual voicemail message may be generated and transmitted, directly or via a visual voicemail system, to the user device. The visual voicemail message may contain any data gathered at blocks 445 or otherwise, and may also include standard or default information. Any other formatting or message generation actions may also be performed at block 450.

At block 455, a determination is made as to whether any other requests or response to the generated response visual voicemail of block 450 have been detected or received. If so, method 400 may return to block 425 to analyze the additional message(s) and perform whatever actions may be desired. Alternatively, any other actions not listed may be taken, and/or any actions of method 400 may be performed in isolation or in any combination. If no additional messages or requests have been received from a user, a system may await such additional messages or requests, or a system may determine that a communications session with a user is complete, for example, after a period of time has elapsed without contact from a user device. Any other means of terminating method 400 may be used and all such means are contemplated as within the scope of the present disclosure.

The methods and systems described above provide ways to improve a customer experience by integrating the physical shopping experience with the virtual shopping experience. By implementing the present disclosure, the user experience is improved due to an increase in response time and the quantity and quality of information available to a user. Set forth below are exemplary systems, devices, and components in which aspects of the present disclosure may be implemented.

Figure 5:
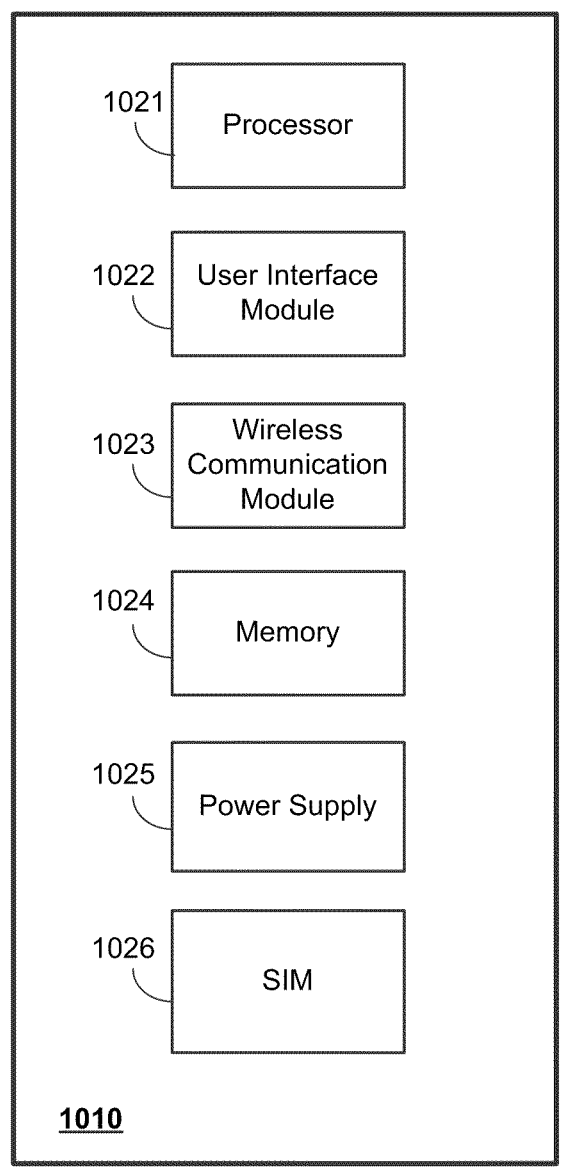
FIG. 5 is a block diagram of a non-limiting, exemplary wireless device that may be used in connection with interactive personalized e-Experience using visual voicemail methods and systems.

FIG. 5 illustrates an example wireless device 1010 that may be used in connection with an embodiment. References will also be made to other figures of the present disclosure as appropriate. For example, wireless devices 111 and 311 may each be a wireless device of the type described in regard to FIG. 5, and may have some, all, or none of the components and modules described in regard to FIG. 5. It will be appreciated that the components and modules of wireless device 1010 illustrated in FIG. 5 are illustrative, and that any number and type of components and/or modules may be present in wireless device 1010. In addition, the functions performed by any or all of the components and modules illustrated in FIG. 5 may be performed by any number of physical components. Thus, it is possible that in some embodiments the functionality of more than one component and/or module illustrated in FIG. 5 may be performed by any number or types of hardware and/or software.

Processor 1021 may be any type of circuitry that performs operations on behalf of wireless device 1010. In one embodiment, processor 1021 executes software (e.g., computer-readable instructions stored in a computer-readable medium) that may include functionality related to systems and methods for an interactive personalized e-Experience using visual voicemail, for example. User interface module 1022 may be any type or combination of hardware and/or software that enables a user to operate and interact with wireless device 1010, and, in one embodiment, to interact with a system or software enabling the user to place, request, and/or receive calls, visual voicemail messages, visual voicemail notifications, visual voicemail content and/or data, and/or a system or software enabling the user to view, modify, or delete related software objects. For example, user interface module 1022 may include a display, physical and/or "soft" keys, voice recognition software, microphone, speaker and the like. Wireless communication module 1023 may be any type of transceiver including any combination of hardware and/or software that enables wireless device 1010 to communicate with wireless network equipment, for example, networks 101 and 301, visual voicemail systems 140 and 340, e-Experience systems 160 and 360, or any other type of wireless communications network or network equipment. Memory 1024 enables wireless device 1010 to store information, such as visual voicemail notifications, visual voicemail client software, visual voicemail data and/or content, multimedia content, software to interact with visual voicemail systems and network devices, and visual voicemail preferences and configurations. Memory 1024 may take any form, such as internal random access memory (RAM), an SD card, a microSD card and the like. Power supply 1025 may be a battery or other type of power input (e.g., a charging cable that is connected to an electrical outlet, etc.) that is capable of powering wireless device 1010. SIM 1026 may be any type Subscriber Identity Module and may be configured on a removable or non-removable SIM card that allows wireless device 1010 to store data on SIM 1026.

Figure 6:
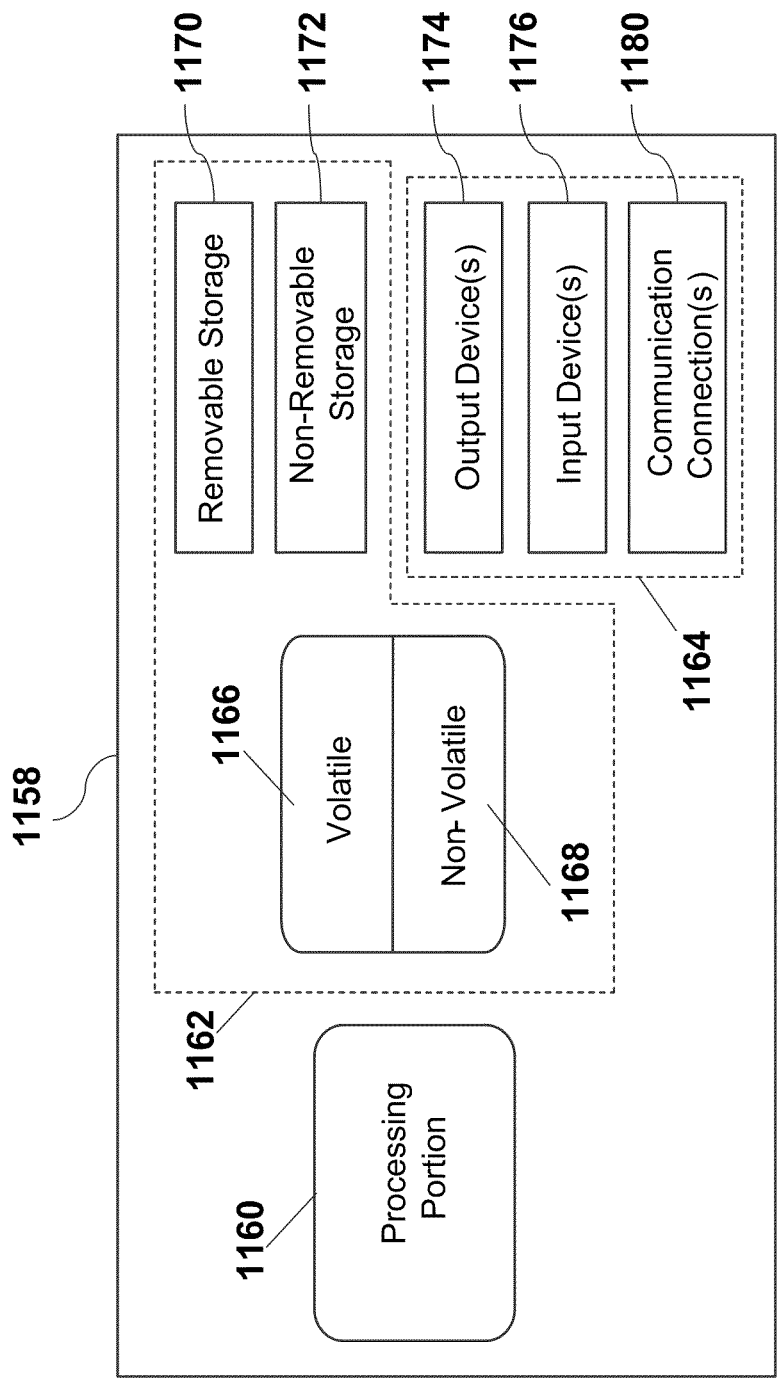
FIG. 6 is a block diagram of a non-limiting, exemplary processor in which interactive personalized e-Experience using visual voicemail methods and systems may be implemented.

FIG. 6 is a block diagram of an example processor 1158 which may be employed in any of the embodiments described herein, including as one or more components of wireless devices 111 and 311, visual voicemail systems 140 and 340, e-Experience systems 160 and 360, computers 125, 155, 325, and 355, as one or more components of network equipment or related equipment, such as any component shown in FIGS. 1 and 3, and/or as one or more components of any third party system or subsystem that may implement any portion of the subject matter described herein. It is emphasized that the block diagram depicted in FIG. 6 is exemplary and not intended to imply a specific implementation. Thus, the processor 1158 can be implemented in a single processor or multiple processors. Multiple processors can be distributed or centrally located. Multiple processors can communicate wirelessly, via hard wire, or a combination thereof.

As depicted in FIG. 6, the processor 1158 comprises a processing portion 1160, a memory portion 1162, and an input/output portion 1164. The processing portion 1160, memory portion 1162, and input/output portion 1164 are coupled together (coupling not shown in FIG. 6) to allow communications between these portions. The input/output portion 1164 is capable of providing and/or receiving components, commands, and/or instructions, utilized to, for example, establish and terminate visual voicemail data communications, transmit and receive visual voicemail notifications, credentials, requests for credentials, transmit, receive, store and process visual voicemail data and/or content, execute software to interact with visual voicemail systems and e-Experience systems, receive and store visual voicemail preferences and configurations, and/or perform any other function described herein.

The processor 1158 can be implemented as a client processor and/or a server processor. In a basic configuration, the processor 1158 may include at least one processing portion 1160 and memory portion 1162. The memory portion 1162 can store any information utilized in conjunction with transmitting, receiving, and/or processing visual voicemail, visual voicemail data and/or content, calls, other telephonic communications, etc. For example, the memory portion is capable of storing visual voicemail preferences, visual voicemail applications, visual voicemail credentials, and/or software capable of processing call requests, operating a visual voicemail client, receiving calls, processing visual voicemail and multimedia content, etc. Depending upon the exact configuration and type of processor, the memory portion 1162 can be volatile (such as RAM) 1166, non-volatile (such as ROM, flash memory, etc.) 1168, or a combination thereof. The processor 1158 can have additional features/functionality. For example, the processor 1158 can include additional storage (removable storage 1170 and/or non-removable storage 1172) including, but not limited to, magnetic or optical disks, tape, flash, smart cards or a combination thereof. Computer storage media, such as memory and storage elements 1162, 1170, 1172, 1166, and 1168, include volatile and nonvolatile, removable and non-removable media implemented in any method or technology for storage of information such as computer-readable instructions, data structures, program modules, or other data. Computer storage media include, but are not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, universal serial bus (USB) compatible memory, smart cards, or any other medium which can be used to store the desired information and which can be accessed by the processor 1158. Any such computer storage media may be part of the processor 1158.

The processor 1158 can also contain the communications connection(s) 1180 that allow the processor 1158 to communicate with other devices, for example through network equipment as illustrated in FIGS. 1 and 3. Communications connection(s) 1180 is an example of communication media. Communication media typically embody computer-readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection as might be used with a land line telephone, and wireless media such as acoustic, RF, infrared, cellular, and other wireless media. The term computer-readable media as used herein includes both storage media and communication media. The processor 1158 also may have input device(s) 1176 such as keyboard, keypad, mouse, pen, voice input device, touch input device, etc. Output device(s) 1174 such as a display, speakers, printer, etc. also may be included.

The networks illustrated in FIGS. 1 and 3 may comprise any appropriate telephony radio network, or any other type of communications network, wireline or wireless, or any combination thereof. The following description sets forth some exemplary telephony radio networks, such as the global system for mobile communications (GSM), and non-limiting operating environments. The below-described operating environments should be considered non-exhaustive, however, and thus the below-described network architectures merely show how systems and methods for an interactive personalized e-Experience using visual voicemail may be implemented with stationary and non-stationary network structures and architectures in order to improve the shopping experience. It can be appreciated, however, that systems and methods for an interactive personalized e-Experience using visual voicemail such as those described herein can be incorporated with existing and/or future alternative architectures for communication networks as well.

The GSM is one of the most widely utilized wireless access systems in today's fast growing communication environment. The GSM provides circuit-switched data services to subscribers, such as mobile telephone or computer users. The General Packet Radio Service (GPRS), which is an extension to GSM technology, introduces packet switching to GSM networks. The GPRS uses a packet-based wireless communication technology to transfer high and low speed data and signaling in an efficient manner. The GPRS attempts to optimize the use of network and radio resources, thus enabling the cost effective and efficient use of GSM network resources for packet mode applications.

The exemplary GSM/GPRS environment and services described herein also can be extended to 3G services, such as Universal Mobile Telephone System (UMTS), Frequency Division Duplexing (FDD) and Time Division Duplexing (TDD), High Speed Packet Data Access (HSPDA), cdma2000 1x Evolution Data Optimized (EVDO), Code Division Multiple Access-2000 (cdma2000 3x), Time Division Synchronous Code Division Multiple Access (TD-SCDMA), Wideband Code Division Multiple Access (WCDMA), Enhanced Data GSM Environment (EDGE), International Mobile Telecommunications-2000 (IMT-2000), Digital Enhanced Cordless Telecommunications (DECT), 4G Services such as Long Term Evolution (LTE), LTE Advanced, etc., as well as to other network services. In this regard, the systems and methods for an interactive personalized e-Experience using visual voicemail may be applied independently of the method of data transport, and do not depend on any particular network architecture, or underlying protocols.

Figure 7:
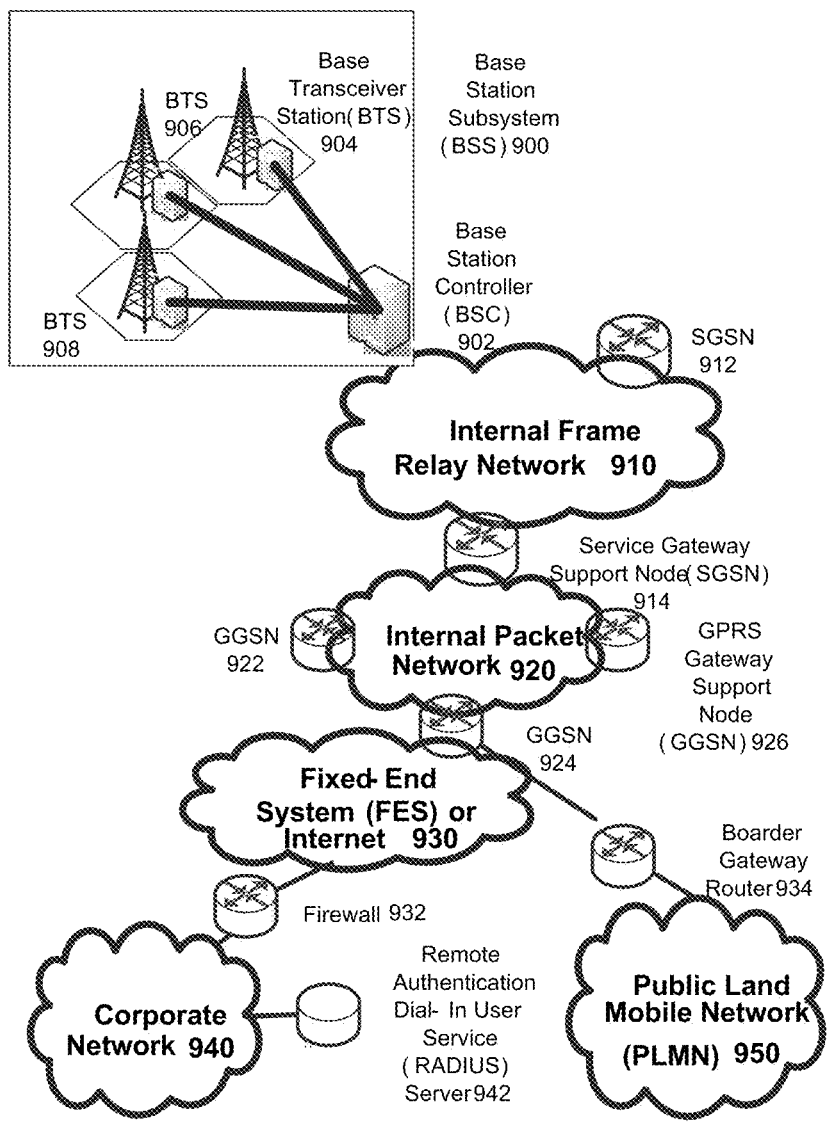
FIG. 7 is a block diagram of an exemplary packet-based mobile cellular network environment, such as a GPRS network, in which interactive personalized e-Experience using visual voicemail methods and systems may be implemented.

FIG. 7 depicts an overall block diagram of an exemplary packet-based mobile cellular network environment, such as a GPRS network, in which the systems and methods for an interactive personalized e-Experience using visual voicemail such as those described herein can be practiced. In an example configuration, networks 101 and 301 as illustrated in FIGS. 1 and 3 may be encompassed by or interact with the network environment depicted in FIG. 7. Similarly, wireless devices 111 and 311 may communicate or interact with a network environment such as that depicted in FIG. 7. In such an environment, there may be a plurality of Base Station Subsystems (BSS) 900 (only one is shown), each of which comprises a Base Station Controller (BSC) 902 serving a plurality of Base Transceiver Stations (BTS) such as BTSs 904, 906, and 908. BTSs 904, 906, 908, etc. are the access points where users of packet-based mobile devices (e.g., wireless devices 111 and 311) become connected to the wireless network. In exemplary fashion, the packet traffic originating from user devices (e.g., wireless devices 111 and 311) may be transported via an over-the-air interface to a BTS 908, and from the BTS 908 to the BSC 902. Base station subsystems, such as BSS 900, may be a part of internal frame relay network 910 that can include Service GPRS Support Nodes (SGSN) such as SGSN 912 and 914. Each SGSN may be connected to an internal packet network 920 through which a SGSN 912, 914, etc. may route data packets to and from a plurality of gateway GPRS support nodes (GGSN) 922, 924, 926, etc. As illustrated, SGSN 914 and GGSNs 922, 924, and 926 may be part of internal packet network 920. Gateway GPRS serving nodes 922, 924 and 926 may provide an interface to external Internet Protocol (IP) networks, such as Public Land Mobile Network (PLMN) 950, corporate intranets 940, or Fixed-End System (FES) or the public Internet 930. As illustrated, subscriber corporate network 940 may be connected to GGSN 924 via firewall 932, and PLMN 950 may be connected to GGSN 924 via border gateway router 934. The Remote Authentication Dial-In User Service (RADIUS) server 942 may be used for caller authentication when a user of a mobile cellular device calls corporate network 940.

Generally, there can be four different cell sizes in a GSM network, referred to as macro, micro, pico, and umbrella cells. The coverage area of each cell is different in different environments. Macro cells may be regarded as cells in which the base station antenna is installed in a mast or a building above average roof top level. Micro cells are cells whose antenna height is under average roof top level. Micro-cells may be typically used in urban areas. Pico cells are small cells having a diameter of a few dozen meters. Pico cells may be used mainly indoors. On the other hand, umbrella cells may be used to cover shadowed regions of smaller cells and fill in gaps in coverage between those cells.

Figure 8:
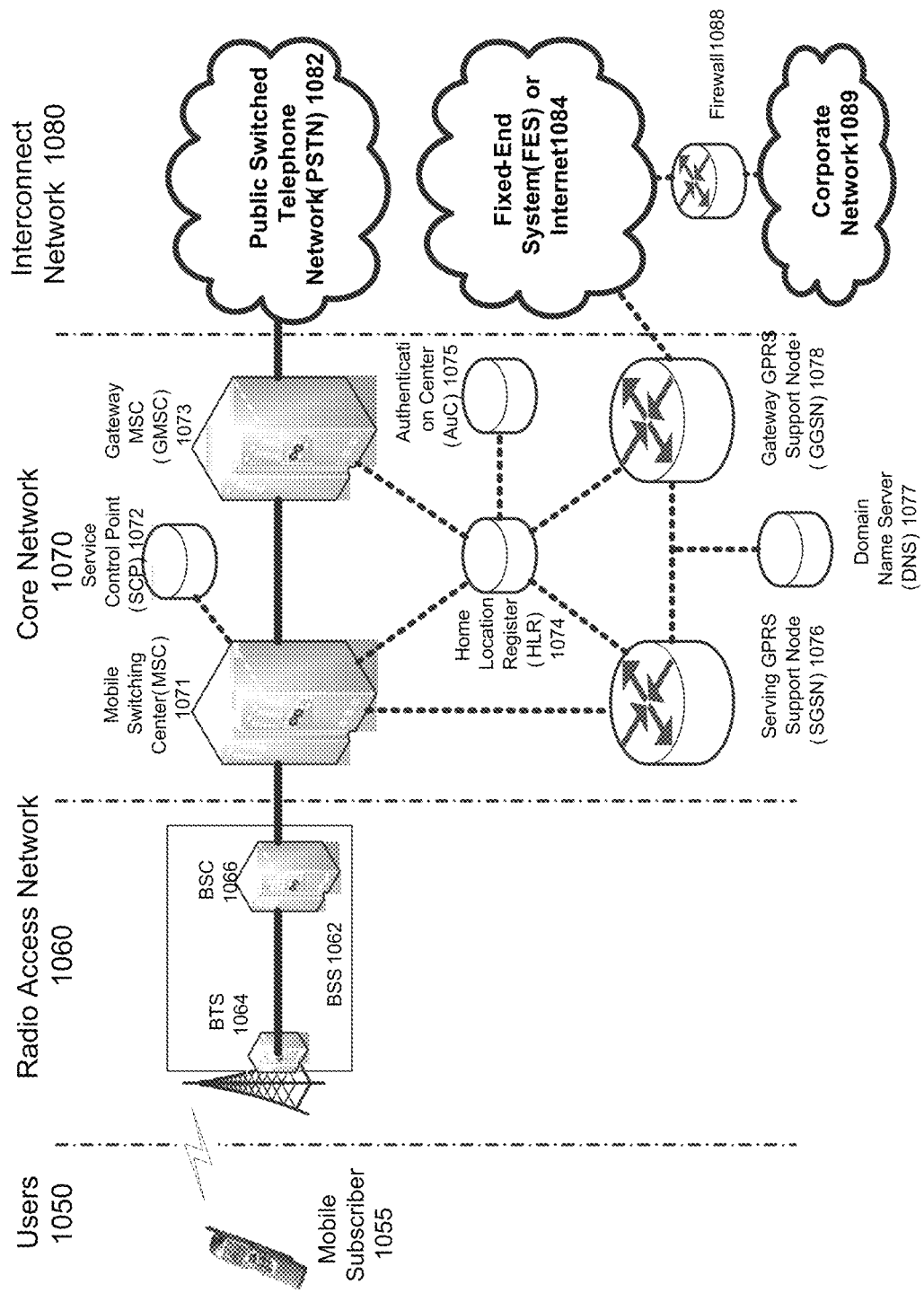
FIG. 8 illustrates a non-limiting, exemplary architecture of a typical GPRS network, segmented into four groups, in which interactive personalized e-Experience using visual voicemail methods and systems may be implemented.

FIG. 8 illustrates an architecture of a typical GPRS network segmented into four groups: users 1050, radio access network 1060, core network 1070, and interconnect network 1080. Users 1050 may comprise a plurality of end users (though only mobile subscriber 1055 is shown in FIG. 8). In an example embodiment, the device depicted as mobile subscriber 1055 may comprise any of wireless devices 111 and 311. Radio access network 1060 comprises a plurality of base station subsystems such as BSSs 1062, which include BTSs 1064 and BSCs 1066. Core network 1070 comprises a host of various network elements. As illustrated here, core network 1070 may comprise Mobile Switching Center (MSC) 1071, Service Control Point (SCP) 1072, gateway MSC 1073, SGSN 1076, Home Location Register (HLR) 1074, Authentication Center (AuC) 1075, Domain Name Server (DNS) 1077, and GGSN 1078. Interconnect network 1080 may also comprise a host of various networks and other network elements. As illustrated in FIG. 8, interconnect network 1080 may comprise Public Switched Telephone Network (PSTN) 1082, Fixed-End System (FES) or Internet 1084, firewall 1088, and Corporate Network 1089.

A mobile switching center may be connected to a large number of base station controllers. At MSC 1071, for instance, depending on the type of traffic, the traffic may be separated in that voice may be sent to Public Switched Telephone Network (PSTN) 1082 through Gateway MSC (GMSC) 1073, and/or data may be sent to SGSN 1076, which then sends the data traffic to GGSN 1078 for further forwarding.

When MSC 1071 receives call traffic, for example, from BSC 1066, it may send a query to a database hosted by SCP 1072. The SCP 1072 may process the request and may issue a response to MSC 1071 so that it may continue call processing as appropriate.

The HLR 1074 may be a centralized database for users to register to the GPRS network. HLR 1074 may store static information about the subscribers such as the International Mobile Subscriber Identity (IMSI), subscribed services, visual voicemail user preferences, and/or a key for authenticating the subscriber. HLR 1074 may also store dynamic subscriber information such as the current location of the mobile subscriber. HLR 1074 may also serve to intercept and determine the validity of destination numbers in messages sent from a device, such as mobile subscriber 1055, as described herein. Associated with HLR 1074 may be AuC 1075. AuC 1075 may be a database that contains the algorithms for authenticating subscribers and may include the associated keys for encryption to safeguard the user input for authentication.

In the following, depending on context, the term "mobile subscriber" sometimes refers to the end user and sometimes to the actual portable device, such as wireless devices 111 and 311, used by an end user of a mobile cellular service or a wireless provider. When a mobile subscriber turns on his or her mobile device, the mobile device may go through an attach process by which the mobile device attaches to an SGSN of the GPRS network. In FIG. 8, when mobile subscriber 1055 initiates the attach process by turning on the network capabilities of the mobile device, an attach request may be sent by mobile subscriber 1055 to SGSN 1076. The SGSN 1076 queries another SGSN, to which mobile subscriber 1055 was attached before, for the identity of mobile subscriber 1055. Upon receiving the identity of mobile subscriber 1055 from the other SGSN, SGSN 1076 may request more information from mobile subscriber 1055. This information may be used to authenticate mobile subscriber 1055 to SGSN 1076 by HLR 1074. Once verified, SGSN 1076 sends a location update to HLR 1074 indicating the change of location to a new SGSN, in this case SGSN 1076. HLR 1074 may notify the old SGSN, to which mobile subscriber 1055 was attached before, to cancel the location process for mobile subscriber 1055. HLR 1074 may then notify SGSN 1076 that the location update has been performed. At this time, SGSN 1076 sends an Attach Accept message to mobile subscriber 1055, which in turn sends an Attach Complete message to SGSN 1076.

After attaching itself to the network, mobile subscriber 1055 may then go through the authentication process. In the authentication process, SGSN 1076 may send the authentication information to HLR 1074, which may send information back to SGSN 1076 based on the user profile that was part of the user's initial setup. The SGSN 1076 may then send a request for authentication and ciphering to mobile subscriber 1055. The mobile subscriber 1055 may use an algorithm to send the user identification (ID) and password to SGSN 1076. The SGSN 1076 may use the same algorithm and compares the result. If a match occurs, SGSN 1076 authenticates mobile subscriber 1055.

Next, the mobile subscriber 1055 may establish a user session with the destination network, corporate network 1089, by going through a Packet Data Protocol (PDP) activation process. Briefly, in the process, mobile subscriber 1055 may request access to the Access Point Name (APN), for example, UPS.com, and SGSN 1076 may receive the activation request from mobile subscriber 1055. SGSN 1076 may then initiate a Domain Name Service (DNS) query to learn which GGSN node has access to the UPS.com APN. The DNS query may be sent to the DNS server within the core network 1070, such as DNS 1077, which may be provisioned to map to one or more GGSN nodes in the core network 1070. Based on the APN, the mapped GGSN 1078 can access the requested corporate network 1089. The SGSN 1076 may then send to GGSN 1078 a Create Packet Data Protocol (PDP) Context Request message that contains necessary information. The GGSN 1078 may send a Create PDP Context Response message to SGSN 1076, which may then send an Activate PDP Context Accept message to mobile subscriber 1055.

Once activated, data packets of the call made by mobile subscriber 1055 may then go through radio access network 1060, core network 1070, and interconnect network 1080, in a particular fixed-end system, or Internet 1084 and firewall 1088, to reach corporate network 1089.

Thus, network elements that can invoke the functionality of an interactive personalized e-Experience system using visual voicemail such as those described herein can include but are not limited to Gateway GPRS Support Node tables, Fixed End System router tables, firewall systems, VPN tunnels, and any number of other network elements as required by the particular digital network.

Figure 9:
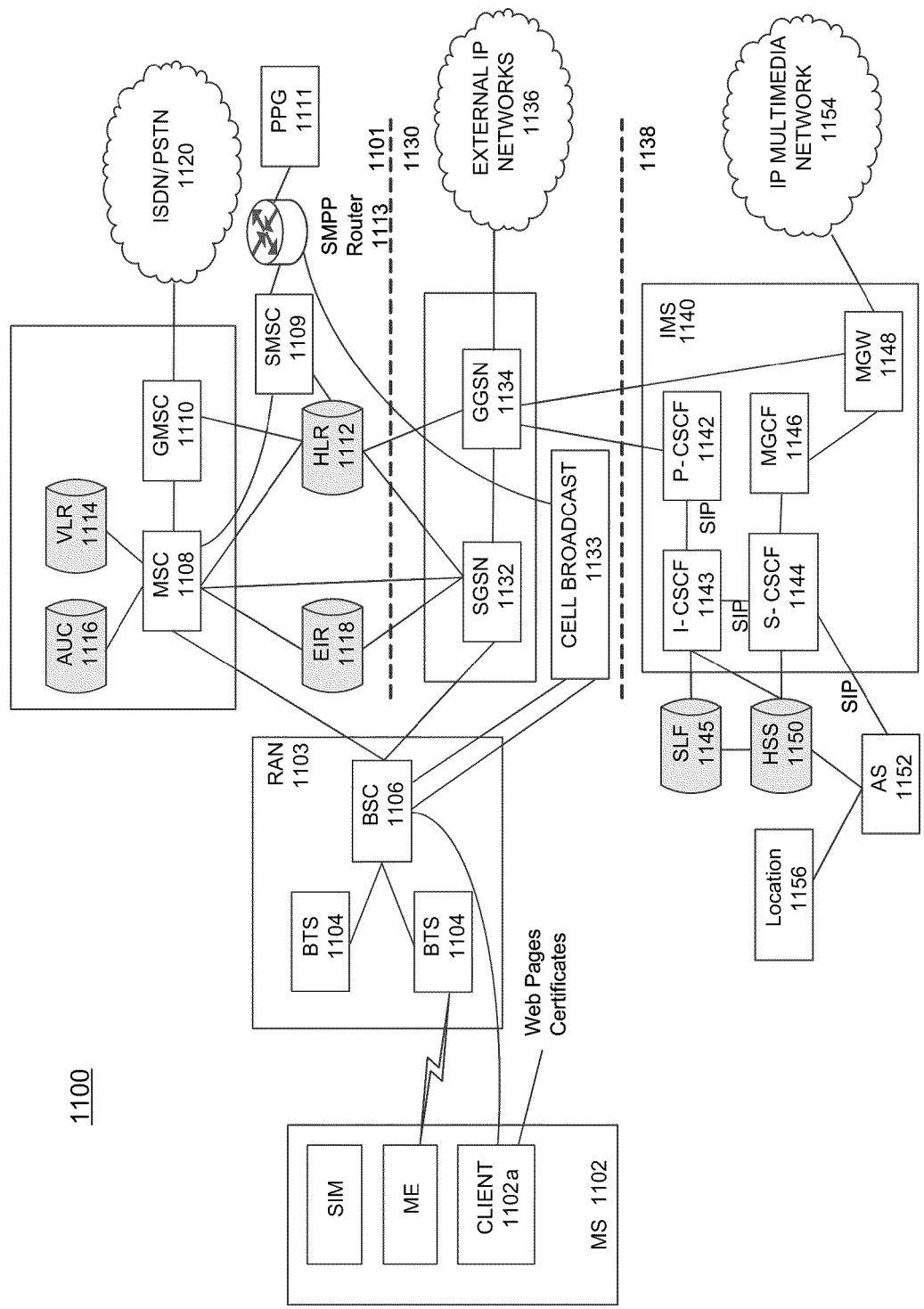
FIG. 9 illustrates a non-limiting alternate block diagram of an exemplary GSM/GPRS/IP multimedia network architecture in which interactive personalized e-Experience using visual voicemail methods and systems may be implemented.

FIG. 9 illustrates another exemplary block diagram view of a GSM/GPRS/IP multimedia network architecture 1100 in which the systems and methods for an interactive personalized e-Experience system using visual voicemail such as those described herein can be incorporated. As illustrated, architecture 1100 of FIG. 9 includes a GSM core network 1101, a GPRS network 1130 and an IP multimedia network 1138. The GSM core network 1101 includes a Mobile Station (MS) 1102, at least one Base Transceiver Station (BTS) 1104 and a Base Station Controller (BSC) 1106. The MS 1102 is physical equipment or Mobile Equipment (ME), such as a mobile telephone or a laptop computer (e.g., wireless devices 111 and 311) that is used by mobile subscribers, in one embodiment with a Subscriber identity Module (SIM). The SIM includes an International Mobile Subscriber Identity (IMSI), which is a unique identifier of a subscriber. The BTS 1104 may be physical equipment, such as a radio tower, that enables a radio interface to communicate with the MS. Each BTS may serve more than one MS. The BSC 1106 may manage radio resources, including the BTS. The BSC may be connected to several BTSs. The BSC and BTS components, in combination, are generally referred to as a base station (BSS) or radio access network (RAN) 1103.

The GSM core network 1101 may also include a Mobile Switching Center (MSC) 1108, a Gateway Mobile Switching Center (GMSC) 1110, a Home Location Register (HLR) 1112, Visitor Location Register (VLR) 1114, an Authentication Center (AuC) 1118, and an Equipment Identity Register (EIR) 1116. The MSC 1108 may perform a switching function for the network. The MSC may also perform other functions, such as registration, authentication, location updating, handovers, and call routing. The GMSC 1110 may provide a gateway between the GSM network and other networks, such as an Integrated Services Digital Network (ISDN) or Public Switched Telephone Networks (PSTNs) 1120. Thus, the GMSC 1110 provides interworking functionality with external networks.

The HLR 1112 is a database that may contain administrative information regarding each subscriber registered in a corresponding GSM network. The HLR 1112 may also contain the current location of each MS. The VLR 1114 may be a database that contains selected administrative information from the HLR 1112. The VLR may contain information necessary for call control and provision of subscribed services for each MS currently located in a geographical area controlled by the VLR. The HLR 1112 and the VLR 1114, together with the MSC 1108, may provide the call routing and roaming capabilities of GSM. The AuC 1116 may provide the parameters needed for authentication and encryption functions. Such parameters allow verification of a subscriber's identity. The EIR 1118 may store security-sensitive information about the mobile equipment.

A Short Message Service Center (SMSC) 1109 allows one-to-one short message service (SMS), or multimedia message service (MMS), messages to be sent to/from the MS 1102. A Push Proxy Gateway (PPG) 1111 is used to "push" (i.e., send without a synchronous request) content to the MS 1102. The PPG 1111 acts as a proxy between wired and wireless networks to facilitate pushing of data to the MS 1102. A Short Message Peer to Peer (SMPP) protocol router 1113 may be provided to convert SMS-based SMPP messages to cell broadcast messages. SMPP is a protocol for exchanging SMS messages between SMS peer entities such as short message service centers. The SMPP protocol is often used to allow third parties, e.g., content suppliers such as news organizations, to submit bulk messages.

To gain access to GSM services, such as voice, data, short message service (SMS), and multimedia message service (MMS), the MS may first register with the network to indicate its current location by performing a location update and IMSI attach procedure. MS 1102 may send a location update including its current location information to the MSC/VLR, via BTS 1104 and BSC 1106. The location information may then be sent to the MS's HLR. The HLR may be updated with the location information received from the MSC/VLR. The location update may also be performed when the MS moves to a new location area. Typically, the location update may be periodically performed to update the database as location updating events occur.

GPRS network 1130 may be logically implemented on the GSM core network architecture by introducing two packet-switching network nodes, a serving GPRS support node (SGSN) 1132, a cell broadcast and a Gateway GPRS support node (GGSN) 1134. The SGSN 1132 may be at the same hierarchical level as the MSC 1108 in the GSM network. The SGSN may control the connection between the GPRS network and the MS 1102. The SGSN may also keep track of individual MS's locations and security functions and access controls.

Cell Broadcast Center (CBC) 1133 may communicate cell broadcast messages that are typically delivered to multiple users in a specified area. Cell Broadcast is one-to-many geographically focused service. It enables messages to be communicated to multiple mobile telephone customers who are located within a given part of its network coverage area at the time the message is broadcast.

GGSN 1134 may provide a gateway between the GPRS network and a public packet network (PDN) or other IP networks 1136. That is, the GGSN may provide interworking functionality with external networks, and set up a logical link to the MS through the SGSN. When packet-switched data leaves the GPRS network, it may be transferred to an external TCP-IP network 1136, such as the Internet, or to any other external network, such as an X.25 network. In order to access GPRS services, the MS first attaches itself to the GPRS network by performing an attach procedure. The MS then activates a packet data protocol (PDP) context, thus activating a packet communication session between the MS, the SGSN, and the GGSN.

In a GSM/GPRS network, GPRS services and GSM services may be used in parallel. The MS may operate in one three classes: class A, class B, and class C. A class A MS may attach to the network for both GPRS services and GSM services simultaneously. A class A MS may also support simultaneous operation of GPRS services and GSM services. For example, class A mobiles may receive GSM voice/data/SMS calls and GPRS data calls at the same time.

A class B MS may attach to the network for both GPRS services and GSM services simultaneously. However, a class B MS does not support simultaneous operation of the GPRS services and GSM services. That is, a class B MS can only use one of the two services at a given time.

A class C MS can attach for only one of the GPRS services and GSM services at a time. Simultaneous attachment and operation of GPRS services and GSM services is not possible with a class C MS.

GPRS network 1130 may be designed to operate in three network operation modes (NOM1, NOM2 and NOM3). A network operation mode of a GPRS network may be indicated by a parameter in system information messages transmitted within a cell. The system information messages may direct a MS where to listen for paging messages and how to signal towards the network. The network operation mode represents the capabilities of the GPRS network. In a NOM1 network, a MS may receive pages from a circuit switched domain (voice call) when engaged in a data call. The MS may suspend the data call or take both simultaneously, depending on the ability of the MS. In a NOM2 network, a MS may not receive pages from a circuit switched domain when engaged in a data call, since the MS is receiving data and is not listening to a paging channel. In a NOM3 network, a MS can monitor pages for a circuit switched network while receiving data and vice versa.

The IP multimedia network 1138 was introduced with 3GPP Release 5, and may include IP multimedia subsystem (IMS) 1140 to provide rich multimedia services to end users. A representative set of the network entities within IMS 1140 are a call/session control function (CSCF), a media gateway control function (MGCF) 1146, a media gateway (MGW) 1148, and a master subscriber database, called a home subscriber server (HSS) 1150. HSS 1150 may be common to GSM core network 1101, GPRS network 1130 as well as IP multimedia network 1138.

IP multimedia system 1140 may be built around the call/session control function, of which there are three types: an interrogating CSCF (I-CSCF) 1143, a proxy CSCF (P-CSCF) 1142, and a serving CSCF (S-CSCF) 1144. The P-CSCF 1142 is the MS's first point of contact with the IMS 1140. The P-CSCF 1142 may forward session initiation protocol (SIP) messages received from the MS to an SIP server in a home network (and vice versa) of the MS. The P-CSCF 1142 may also modify an outgoing request according to a set of rules defined by the network operator (for example, address analysis and potential modification).

I-CSCF 1143 forms an entrance to a home network and hides the inner topology of the home network from other networks and provides flexibility for selecting an S-CSCF. I-CSCF 1143 may contact subscriber location function (SLF) 1145 to determine which HSS 1150 to use for the particular subscriber, if multiple HSSs 1150 are present. S-CSCF 1144 may perform the session control services for MS 1102. This includes routing originating sessions to external networks and routing terminating sessions to visited networks. S-CSCF 1144 may also decide whether an application server (AS) 1152 is required to receive information on an incoming SIP session request to ensure appropriate service handling. This decision may be based on information received from HSS 1150 (or other sources, such as application server 1152). AS 1152 may also communicate to location server 1156 (e.g., a Gateway Mobile Location Center (GMLC)) that provides a position (e.g., latitude/longitude coordinates) of MS 1102.

HSS 1150 may contain a subscriber profile and keep track of which core network node is currently handling the subscriber. It may also support subscriber authentication and authorization functions (AAA). In networks with more than one HSS 1150, a subscriber location function may provide information on the HSS 1150 that contains the profile of a given subscriber.

MGCF 1146 may provide interworking functionality between SIP session control signaling from the IMS 1140 and ISUP/BICC call control signaling from the external GSTN networks (not shown.) It may also control the media gateway (MGW) 1148 that provides user-plane interworking functionality (e.g., converting between AMR- and PCM-coded voice.) MGW 1148 may also communicate with other IP multimedia networks 1154.

Push to Talk over Cellular (PoC) capable mobile telephones may register with the wireless network when the telephones are in a predefined area (e.g., job site, etc.) When the mobile telephones leave the area, they may register with the network in their new location as being outside the pre-defined area. This registration, however, does not indicate the actual physical location of the mobile telephones outside the pre-defined area.

While example embodiments of systems and methods for an interactive personalized e-Experience system using visual voicemail have been described in connection with various communications devices and computing devices/processors, the underlying concepts can be applied to any communications or computing device, processor, or system capable of implementing the systems and methods described. The various techniques described herein can be implemented in connection with hardware or software or, where appropriate, with a combination of both. Thus, the methods and apparatuses for an interactive personalized e-Experience system using visual voicemail, or certain aspects or portions thereof, can take the form of program code (i.e., instructions) embodied in tangible, non-transitory media, such as floppy diskettes, CD-ROMs, hard drives, or any other machine-readable storage medium, wherein, when the program code is loaded into and executed by a machine, such as a computer, the machine becomes an apparatus for an interactive personalized e-Experience system. In the case of program code execution on programmable computers, the computing device will generally include a processor, a storage medium readable by the processor (including volatile and non-volatile memory and/or storage elements), at least one input device, and at least one output device. The program(s) can be implemented in assembly or machine language, if desired. The language can be a compiled or interpreted language, and combined with hardware implementations.

Methods and systems for an interactive personalized e-Experience system using visual voicemail can also be practiced via communications embodied in the form of program code that is transmitted over some transmission medium, such as over electrical wiring or cabling, through fiber optics, or via any other form of transmission, wherein, when the program code is received and loaded into and executed by a machine, such as an EPROM, a gate array, a programmable logic device (PLD), a client computer, or the like, the machine becomes an apparatus for an interactive personalized e-Experience system. When implemented on a general-purpose processor, the program code combines with the processor to provide a unique apparatus that operates to invoke the functionality of an interactive personalized e-Experience system using visual voicemail as described herein. Additionally, any storage techniques used in connection with a visual voicemail system can invariably be a combination of hardware and software.

While systems and methods for an interactive personalized e-Experience system using visual voicemail have been described in connection with the various embodiments of the various figures, it is to be understood that other similar embodiments can be used or modifications and additions can be made to the described embodiments for performing the same function of providing an interactive personalized e-Experience system using visual voicemail without deviating therefrom. For example, one skilled in the art will recognize that an interactive personalized e-Experience system using visual voicemail as described in the present application may apply to any environment, whether wired or wireless, and may be applied to any number of such devices connected via a communications network and interacting across the network. Therefore, an interactive personalized e-Experience system using visual voicemail should not be limited to any single embodiment, but rather should be construed in breadth and scope in accordance with the appended claims.

What is claimed is:

1. A method comprising:
   determining, at an e-Experience system, a device identifier for a mobile wireless device;
   determining, at the e-Experience system and based on the device identifier, user data for a user associated with the mobile wireless device;
   receiving, at the e-Experience system, a first signal strength measurement for the mobile wireless device, the first signal strength measurement being indicative of being sent from a first stationary wireless device at a first product display;
   receiving, at the e-Experience system, a second signal strength measurement for the mobile wireless, the second signal strength measurement being indicative of being sent from a second stationary wireless device at a second product display;
   determining, at the e-Experience system, that the first signal strength measurement is greater than the second signal strength measurement;
   responsive to determining that the first signal strength measurement is greater than the second signal strength measurement, generating, at the e-Experience system, a visual voicemail message based on the user data and product data for the first product display; and
   transmitting the visual voicemail message from the e-Experience system to the mobile wireless device.

2. The method of claim 1, wherein the visual voicemail message comprises interactive content.

3. The method of claim 2, wherein the interactive content comprises a control that generates a request for assistance.

4. The method of claim 2, wherein the interactive content comprises a control that generates a request for product information.

5. The method of claim 2, wherein the interactive content comprises a control that generates a request for product location information.

6. The method of claim 2, wherein the interactive content comprises a control that generates a request for service plan information.

7. The method of claim 1, wherein at least one of the first stationary wireless device or the second stationary wireless device is a wireless hub.

8. The method of claim 1, wherein the at least a portion of the user data comprises user account data.

9. A computer-readable medium that is not a transient signal, the computer-readable medium comprising computer-executable instructions that, when executed by a computer, perform operations comprising:
   determining a device identifier for a mobile wireless device;
   determining, based on the device identifier, user data for a user associated with the mobile wireless device;
   receiving a first signal strength measurement for the mobile wireless device, the first signal strength measurement being indicative of being sent from a first stationary wireless device at a first product display;
   receiving a second signal strength measurement for the mobile wireless device, the second signal strength measurement being indicative of being sent from a second stationary wireless device at a second product display;
   determining that the first signal strength measurement is greater than the second signal strength measurement;
   responsive to determining that the first signal strength measurement is greater than the second signal strength measurement, generating a visual voicemail message based on the user data and product data for the first product display; and
   transmitting the visual voicemail message to the mobile wireless device.

10. The computer-readable medium of claim 9, further comprising detecting the mobile wireless device at a premises by receiving an indication that the mobile wireless device is at the premises from a wireless hub at the premises.

11. The computer-readable medium of claim 10, wherein the wireless hub comprises at least one of the first stationary wireless device or the second stationary wireless device.

12. The computer-readable medium of claim 9, wherein the operations further comprise receiving a response to the visual voicemail message comprising a request.

13. The computer-readable medium of claim 9, wherein at least one of the first stationary wireless device or the second stationary wireless device is a wireless hub.

14. The computer-readable medium of claim 9, wherein the operations further comprise transmitting instructions to present a bill payment interface to the mobile wireless device.

15. The computer-readable medium of claim 9, wherein the operations further comprise transmitting a request for data to a plurality of resources responsive to receiving a response to the visual voicemail message.

16. A system comprising:
   a memory comprising instructions;
   a processor communicatively connected to the memory, wherein the processor, when executing the instructions, performs operations comprising:
      determining a device identifier for a user device,
      determining user data based on the device identifier,
      receiving a first signal strength measurement for the user device, the first signal strength measurement being indicative of being sent from a first stationary wireless device at a first product display;
      receiving a second signal strength measurement for the user device, the second signal strength measurement being indicative of being sent from a second stationary wireless device at a second product display;
      determining that the first signal strength measurement is greater than the second signal strength measurement, and
      responsive to determining that the first signal strength measurement is greater than the second signal strength measurement generating visual voicemail content based on the user data and product data for the first product; and
   a transceiver communicatively connected to the processor, the transceiver configured to transmit the visual voicemail content to a visual voicemail system.

17. The system of claim 16, wherein the transceiver is further configured to receive a response and transmit a request for data to a plurality of resources.

18. The system of claim 17, wherein the transceiver is further configured to:
   receive the data from the plurality of resources, and
   transmit additional visual voicemail content to the visual voicemail system;
   wherein the processor is further configured to generate the additional visual voicemail content comprising at least a portion of the data.

19. The system of claim 16, wherein the processor is further configured to determine that a response received from the user device indicates a need for in-person assistance; and
   wherein the transceiver is further configured to transmit a notification requesting in-person assistance.

20. The system of claim 16, wherein at least one of the first stationary wireless device or the second stationary wireless device is a wireless hub.

* * * * *